United States Patent
Sato et al.

(10) Patent No.: US 12,548,305 B2
(45) Date of Patent: Feb. 10, 2026

(54) INFORMATION PROCESSING SYSTEM AND INFORMATION PROCESSING METHOD

(71) Applicant: Panasonic Intellectual Property Corporation of America, Torrance, CA (US)

(72) Inventors: Satoshi Sato, Kyoto (JP); Yasunori Ishii, Osaka (JP); Kunio Nobori, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 113 days.

(21) Appl. No.: 18/508,994

(22) Filed: Nov. 14, 2023

(65) Prior Publication Data

US 2024/0087301 A1 Mar. 14, 2024

Related U.S. Application Data

(63) Continuation of application No. PCT/JP2022/018214, filed on Apr. 19, 2022.

(30) Foreign Application Priority Data

May 20, 2021 (JP) ................................. 2021-085196

(51) Int. Cl.
*G06V 10/776* (2022.01)
*G06T 7/70* (2017.01)
(Continued)

(52) U.S. Cl.
CPC .............. *G06V 10/776* (2022.01); *G06T 7/70* (2017.01); *G06V 10/774* (2022.01); *H04N 23/61* (2023.01); *G06T 2207/20081* (2013.01)

(58) Field of Classification Search
CPC ... G06T 2207/20081; G06T 7/00; G06T 7/70; G06V 10/774; G06V 10/776; H04N 23/61; H04N 23/617; H04N 7/18
See application file for complete search history.

(56) References Cited

U.S. PATENT DOCUMENTS

2019/0164312 A1* 5/2019 Sunkavalli ........... G06N 3/0464
2020/0218980 A1* 7/2020 Matsumoto .............. G06N 3/09
(Continued)

OTHER PUBLICATIONS

International Search Report (ISR) from International Searching Authority (Japan Patent Office) in International Pat. Appl. No. PCT/JP2022/018214, dated Jul. 19, 2022, together with an English language translation.

(Continued)

*Primary Examiner* — Amy R Hsu
(74) *Attorney, Agent, or Firm* — Greenblum & Bernstein, P.L.C.

(57) ABSTRACT

An imaging control device includes a correct answer information acquiring part that acquires first correct answer information corresponding to a training image of a machine learning model from a first storage part, a correct answer image display control part that causes a display device to display a first correct answer image based on the first correct answer information, an imaging control part that causes an imaging device that acquires a blurred image to capture the first correct answer image displayed on the display device and acquires a second correct answer image, a correct answer information generating part that generates second correct answer information based on the second correct answer image, and a storage control part that stores a data set including a set of the training image and the second correct answer information in a second storage part.

13 Claims, 23 Drawing Sheets

(51) Int. Cl.
*G06V 10/774* (2022.01)
*H04N 23/61* (2023.01)

(56) References Cited

U.S. PATENT DOCUMENTS

2021/0264210 A1* 8/2021 Ueta .................. G06F 18/2148
2022/0415024 A1* 12/2022 Toyoda ................ G06N 3/0464

OTHER PUBLICATIONS

Tan et al., "Face Detection and Verification Using Lensless Cameras", IEEE Transactions On Computational Imaging, vol. 5, No. 2, Jun. 2019, pp. 180-194.

* cited by examiner

348

349

| (u, v) | (x, y) |
|---|---|
| (u1, v1) | (x1_1, y1_1), (x1_2, y1_2) |
| (u2, v2) | (x2_1, y2_1), (x2_2, y2_2) |
| (u3, v3) | (x3_1, y3_1), (x3_2, y3_2) |
| (u4, v4) | (x4_1, y4_1), (x4_2, y4_2) |
| ... | ... |

INFORMATION PROCESSING SYSTEM AND INFORMATION PROCESSING METHOD

TECHNICAL FIELD

The present disclosure relates to a technique that creates a data set to be used for training a machine learning model.

BACKGROUND ART

For example, Non-Patent Literature 1 discloses a method for displaying an image captured by a normal camera on a display and causing the lensless camera to capture the image displayed on the display to create a data set for training a face detection model using the lensless camera.

However, since a training image captured by a camera that acquires a blurred image is an image that is difficult for a human to recognize, it is difficult to give accurate correct answer information to the captured training image. In addition, inaccuracy of the correct answer information leads to performance degradation of a machine learning model to be trained. Therefore, even if the machine learning model is trained by using a data set including a training image to which inaccurate correct answer information is given, it is difficult to improve the recognition accuracy of the machine learning model while protecting the privacy of a subject.

CITATION LIST

Non Patent Literature

Non-Patent Literature 1: Jasper Tan, Li Niu, Jesse K. Adams, Vivek Boominathan, Jacob T. Robinson, and Richard G. Baraniuk, "Face Detection and Verification Using Lensless Cameras", IEEE Transactions on Computational Imaging, vol. 5, No. 2, pp. 180-194, 2019

SUMMARY OF INVENTION

The present disclosure has been made to solve the above problem, and an object of the present disclosure is to provide a technique that enables improvement of recognition accuracy of a machine learning model while protecting privacy of a subject.

An information processing system of the present disclosure includes a correct answer information acquiring part that acquires first correct answer information corresponding to a training image of a machine learning model from a first storage part, a correct answer image display control part that causes a display device to display a first correct answer image based on the first correct answer information, an imaging control part that causes an imaging device that acquires a blurred image to capture the first correct answer image displayed on the display device and acquires a second correct answer image, a generating part that generates second correct answer information based on the second correct answer image, and a storage control part that stores a data set including a set of the training image and the second correct answer information in a second storage part.

According to the present disclosure, it is possible to improve recognition accuracy of a machine learning model while protecting the privacy of a subject.

Figure 1:
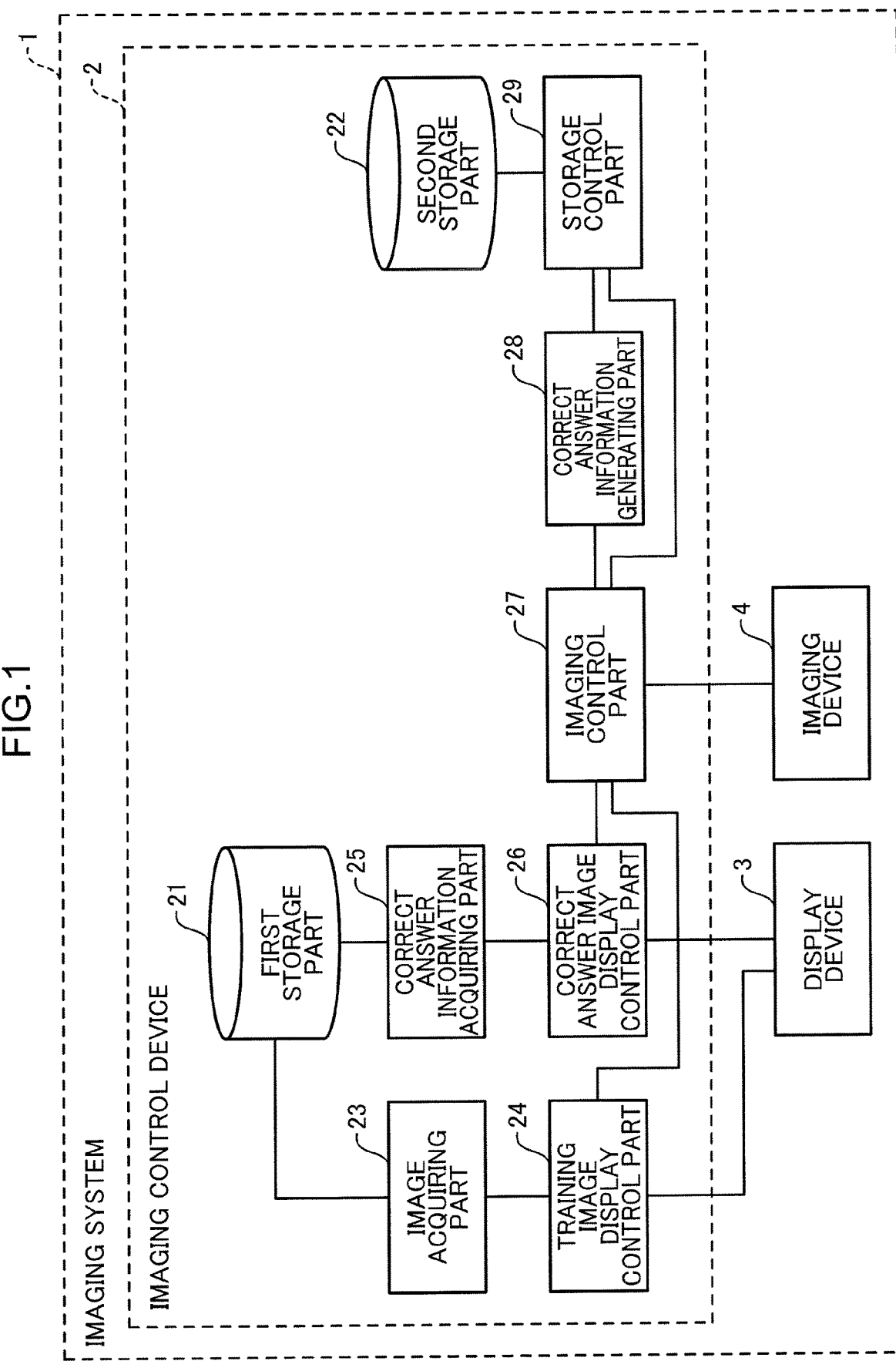
FIG. 1 is a block diagram illustrating an example of an overall configuration of an imaging system according to a first embodiment of the present disclosure.

DESCRIPTION OF EMBODIMENTS (Knowledge Underlying Present Disclosure)

In home, indoor, or the like, various recognition techniques are important, such as behavior recognition of a person in an environment or person recognition of a device operator. In recent years, a technique called deep learning has attracted attention for object recognition. The deep learning is machine learning using a neural network having a multilayer structure, and by using a large amount of training data, the deep learning enables more accurate recognition performance to be achieved than by a conventional method. In such object recognition, image information is particularly effective. Various methods have been proposed for greatly improving a conventional object recognition capability by using a camera as an input device and performing deep learning using image information as an input.

Unfortunately, disposing a camera in home or the like causes a problem that privacy is violated when a captured image leaks to the outside due to hacking or the like. Thus, a countermeasure is required to protect privacy of a subject even when a captured image leaks to the outside.

For example, as a camera for obtaining a blurred image that is difficult to be visually recognized by a person, there is provided a multi-pinhole camera. Images captured by the multi-pinhole camera are difficult to be visually recognized by a person due to blurring that is intentionally created due to an influence such as superimposition of multiple images each having a different viewpoint, or a subject image that is less likely to be focused due to non-use of a lens. Thus, the images captured by the multi-pinhole camera are preferably used to construct an image recognition system in an environment requiring privacy protection, such as home or indoor.

In the image recognition system, a target area is imaged by the multi-pinhole camera, and a captured image is input to an identifier. This configuration allows the identifier to identify a face included in the input captured image using a learned identification model. When the target area is imaged by the multi-pinhole camera, privacy of a subject can be protected even if the captured image leaks to the outside. This is because the captured image is difficult to be visually recognized by a person.

In order to train such an identifier, Non-Patent Literature 1 discloses an imaging method for displaying an image captured by a normal camera on a display and causing the lensless camera to capture the image displayed on the display to create a training data set. An identification task of the image recognition system is not detection processing but classification processing such object identification or face authentication. In a case where the identification task is the classification processing, correct answer information used in training is provided to each image, and thus correct answer information prepared in advance can be used. On the other hand, in a case where the identification task is detection processing such as object detection or region division, correct answer information such as a bounding box indicating a position of a detection target in an image has to be provided not to each image but to each pixel.

However, since a training image captured by a multi-pinhole camera or a lensless camera is an image that is difficult for a human to recognize, it is difficult to give accurate correct answer information to the captured training image. In addition, inaccuracy of the correct answer information leads to performance degradation of a machine learning model to be trained. Therefore, even if the machine learning model is trained by using a data set including a training image to which inaccurate correct answer information is given, it is difficult to improve the recognition accuracy of the machine learning model while protecting the privacy of a subject.

In order to solve such a problem, the present inventors have devised an information processing method with which not only a training image but also a correct answer image based on correct answer information is displayed on a display at a stage of accumulating training data sets, and correct answer information is generated based on an image acquired by capturing the displayed correct answer image. As a result, the present inventors have found that accurate correct answer information can be acquired, and recognition accuracy of a machine learning model can be improved while privacy of a subject is protected, and have conceived the present disclosure.

In order to solve the above problem, an information processing system according to one aspect of the present disclosure includes a correct answer information acquiring part that acquires first correct answer information corresponding to a training image of a machine learning model from a first storage part, a correct answer image display control part that causes a display device to display a first correct answer image based on the first correct answer information, an imaging control part that causes an imaging device that acquires a blurred image to capture the first correct answer image displayed on the display device and acquires a second correct answer image, a generating part that generates second correct answer information based on the second correct answer image, and a storage control part that stores a data set including a set of the training image and the second correct answer information in a second storage part.

According to this configuration, the first correct answer image based on the first correct answer information corresponding to the training image of the machine learning model is displayed on the display device. Then, the imaging device that acquires a blurred image captures the first correct answer image displayed on the display device, and the second correct answer image is acquired. The second correct answer information is generated based on the acquired second correct answer image. Then, the data set including the set of the training image and the second correct answer information is stored in the second storage part.

Therefore, since the accurate second correct answer information depending on a degree of blurring of the imaging device can be generated and the data set including the set of the training image and the second correct answer information can be accumulated, the recognition accuracy of the machine learning model can be improved while the privacy of the subject is protected.

Further, in the above information processing system, the first correct answer image may include an object indicating a position of the first correct answer information in the image.

According to this configuration, the first correct answer image includes the object indicating the position of the first correct answer information in the image, and the position of an object to be detected in the image can be specified by the object. Therefore, the accurate second correct answer information can be generated, and the recognition accuracy of the machine learning model that performs object detection can be improved.

In the above information processing system, the object may be a frame, the imaging control part may acquire the second correct answer image where a plurality of the frames is superimposed, and the generating part may select one frame from the plurality of frames based on luminance or a position of each of the plurality of frames in the second correct answer image, and generate correct answer information represented by the selected one frame as the second correct answer information.

According to this configuration, the position of the object to be detected in the image can be specified by one frame selected based on the luminance or the position of each of the plurality of superimposed frames. Therefore, the accurate second correct answer information can be generated, and the recognition accuracy of the machine learning model that performs object detection can be improved.

In the above information processing system, the object may be a frame, the imaging control part may acquire the second correct answer image where a plurality of the frames is superimposed, and the generating part may specify a circumscribed frame circumscribing the plurality of frames in the second correct answer image and generate correct answer information represented by the specified circumscribed frame as the second correct answer information.

According to this configuration, the position of the object to be detected in the image can be specified by the circumscribed frame circumscribing the plurality of superimposed frames. Therefore, the accurate second correct answer information can be generated, and the recognition accuracy of the machine learning model that performs object detection can be improved.

Further, in the above information processing system, the object may be a frame, the imaging control part may acquire the second correct answer image where a plurality of the frames is superimposed, and the generating part may specify a circumscribed frame circumscribing the plurality of frames in the second correct answer image, determine a center of the specified circumscribed frame as a reference position in the image, and generate correct answer information represented by a frame whose center is the determined reference position and whose size is identical to the frame, as the second correct answer information.

According to this configuration, the circumscribed frame circumscribing the plurality of superimposed frames is specified, the center of the specified circumscribed frame is determined as the reference position in the image, and a position of the object to be detected in the image can be specified by a frame whose center is the determined reference position and whose size is identical to the frame. Therefore, the accurate second correct answer information can be generated, and the recognition accuracy of the machine learning model that performs object detection can be improved.

Further, in the above information processing system, the object may be a first region, the imaging control part may acquire the second correct answer image where a plurality of the first regions is superimposed, and the generating part may determine a reference position in the image based on luminance of a second region where the plurality of first regions is superimposed in the second correct answer image, and generate correct answer information represented by a region whose center is the determined reference position and whose size is identical to the first region, as the second correct answer information.

According to this configuration, the reference position in the image is determined based on the luminance in the second region where the plurality of the first regions is superimposed, and the position of the object to be detected in the image can be specified by the region whose center is the determined reference position and whose size is identical to the first region. Therefore, accurate second correct answer information can be generated, and the recognition accuracy of the machine learning model that performs object detection can be improved.

Further, in the above information processing system, the object may be a first region, the imaging control part may acquire the second correct answer image where a plurality of the first regions is superimposed, and the generating part may specify a circumscribed frame circumscribing a second region where the plurality of the first regions is superimposed in the second correct answer image and generate correct answer information represented by the specified circumscribed frame as the second correct answer information.

According to this configuration, the position of the object to be detected in the image can be specified by the circumscribed frame circumscribing the second region where the plurality of the first regions is superimposed. Therefore, the accurate second correct answer information can be generated, and the recognition accuracy of the machine learning model that performs object detection can be improved.

Further, in the above information processing system, the object may be a first region, the imaging control part may acquire the second correct answer image where a plurality of the first regions is superimposed, and the generating part may specify a circumscribed frame circumscribing a second region where the plurality of the first regions is superimposed in the second correct answer image, determine a center of the specified circumscribed frame as a reference position in the image, and generate correct answer information represented by a region whose center is the determined reference position and whose size is identical to the first region, as the second correct answer information.

According to this configuration, the circumscribed frame circumscribing the second region where the plurality of the first regions is superimposed is specified, the center of the specified circumscribed frame is determined as the reference position in the image, and a position of the object to be detected in the image can be specified by the frame whose center is the determined reference position and whose size is identical to the first region. Therefore, the accurate second correct answer information can be generated, and the recognition accuracy of the machine learning model that performs object detection can be improved.

Further, in the above information processing system, the generating part may specify a region including a plurality of objects in the second correct answer image, and generate correct answer information represented by the specified region as the second correct answer information.

According to this configuration, the position of the object to be detected in the image can be specified by a region including the plurality of objects in the second correct answer image. Therefore, the accurate second correct answer information can be generated, and the recognition accuracy of the machine learning model that performs object detection can be improved.

Further, in the above information processing system, the training image stored in the first storage part may be a first training image without blurring, the first training image being acquired by another imaging device different from the imaging device. The information processing system may further include an image acquiring part that acquires the first training image from the first storage part, and a training image display control part that causes the display device to display the first training image. The imaging control part may cause the imaging device to capture the first training image displayed on the display device, and acquire a second training image, and the storage control part may store a data set including a set of the second training image and the second correct answer information in the second storage part.

According to this configuration, the data set including the set of the second training image depending on the degree of blurring of the imaging device and the accurate second correct answer information depending on the degree of blurring of the imaging device can be accumulated.

Further, the information processing system may further include a training part that trains the machine learning model using the data set that includes the set of the training image and the second correct answer information and is stored in the second storage part.

According to this configuration, the machine learning model is trained by using the data set that includes the set of the second training image and the second correct answer information and is stored in the second storage part, thus improving the recognition capability of the machine learning model for recognizing a subject from the captured image having blurring depending on the distance to the subject.

The present disclosure can be implemented not only as the information processing system having the characteristic configuration as described above, but also as an information processing method or the like for executing characteristic processing corresponding to the characteristic configuration of the information processing system. Therefore, even other aspects below can achieve an effect as in the above information processing system.

An information processing method according to another aspect of the present disclosure with which a computer performs the method including acquiring first correct answer information corresponding to a training image of a machine learning model from a first storage part, causing a display device to display a first correct answer image based on the first correct answer information, causing an imaging device that acquires a blurred image to capture the first correct answer image displayed on the display device and acquiring a second correct answer image, generating second correct answer information based on the second correct answer image, and storing a data set including a set of the training image and the second correct answer information in a second storage part.

The information processing system according to another aspect of the present disclosure includes an acquiring part that acquires first correct answer information corresponding to a training image of a machine learning model from a first storage part, a geometric image display control part that causes a display device to display a first geometric image, an imaging control part that causes an imaging device that acquires a blurred image to capture the first geometric image displayed on the display device and acquires a second geometric image, a conversion table generating part that generates a conversion table for converting a position of the first geometric image to a position of the second geometric image, a converting part that converts the first correct answer information to second correct answer information by using the conversion table, and a storage control part that stores a data set including a set of the training image and the second correct answer information in a second storage part.

According to this configuration, the imaging device that acquires a blurred image captures the first geometric image displayed on the display device, and the second geometric image is acquired. The conversion table for converting the position of the first geometric image to the position of the second geometric image is generated. Then, the first correct answer information corresponding to the training image of the machine learning model is converted to the second correct answer information by using the conversion table, and the data set including the set of the training image and the second correct answer information is stored in the second storage part.

Therefore, since the accurate second correct answer information depending on a degree of blurring of the imaging device can be generated and the data set including the set of the training image and the second correct answer information can be accumulated, the recognition accuracy of the machine learning model can be improved while the privacy of the subject is protected.

Further, in the above information processing system, the first geometric image may include a first dot disposed at a predetermined position in the image, and the conversion table generating part may specify positions of a plurality of second dots in the second geometric image and generate a conversion table for converting the position of the first dot to the specified positions of the plurality of second dots.

According to this configuration, the first geometric image includes the first dot arranged at a predetermined position in the image. The positions of the plurality of second dots are specified in the second geometric image, and the conversion table for converting the position of the first dot to the specified positions of the plurality of second dots is generated. With the conversion table, for example, the position of the frame represented by the first correct answer information is converted to the position of the frame depending on the degree of blurring of the imaging device, and the converted position of the frame is generated as the second correct answer information. Therefore, accurate second correct answer information depending on the degree of blurring of the imaging device can be generated.

Further, in the above information processing system, the first geometric image may include a first horizontal line and a first vertical line provided at predetermined positions in the image, and the conversion table generating part may specify positions of a plurality of second horizontal lines and a plurality of second vertical lines in the second geometric image, and generate a conversion table for converting the position of the first horizontal line to the specified positions of the plurality of second horizontal lines, and converting the position of the first vertical line to the specified positions of the plurality of second vertical lines.

According to this configuration, the first geometric image includes the first horizontal line and the first vertical line provided at predetermined positions in the image. The positions of the plurality of second horizontal lines and the plurality of second vertical lines are specified in the second geometric image, and a conversion table for converting the position of the first horizontal line to the specified positions of the plurality of second horizontal lines and converting the position of the first vertical line to the specified positions of the plurality of second vertical lines is generated. With the conversion table, for example, the position of the frame represented by the first correct answer information is converted to the position of the frame depending on the degree of blurring of the imaging device, and the converted position of the frame is generated as the second correct answer information. Therefore, accurate second correct answer information depending on the degree of blurring of the imaging device can be generated.

Embodiments of the present disclosure will be described below with reference to the accompanying drawings. The following embodiments are examples embodying the present disclosure, and are not intended to limit a technical scope of the present disclosure.

First Embodiment

FIG. 1 is a block diagram illustrating an example of an overall configuration of an imaging system 1 according to a first embodiment of the present disclosure.

The imaging system 1 includes an imaging control device 2, a display device 3, and an imaging device 4.

The display device 3 is, for example, a liquid crystal display device or an organic electro luminescence (EL) display device. The display device 3 is controlled by the imaging control device 2 and displays an image output from the imaging control device 2. Note that the display device 3 may be a projector that projects an image on a screen.

The imaging device 4 is, for example, a computational imaging camera such as a lensless camera, a coded aperture camera, a multi-pinhole camera, a lensless multi-pinhole camera, or a light-field camera. The imaging device 4 acquires a blurred image by imaging.

The imaging device 4 is disposed at a position where a display screen of display device 3 can be imaged. The imaging device 4 in the first embodiment is a lensless multi-pinhole camera in which a mask having a mask pattern having a plurality of pinholes is provided to cover a light receiving surface of an imaging element. In other words, it can be said that the mask pattern is provided between a subject and the light receiving surface.

Unlike a normal camera that captures a normal image without blurring, the imaging device 4 captures a computational image serving as an image with blurring. The computational image is an image from which, due to intentionally created blurring, a person cannot recognize a subject even if the person sees the image itself.

Figure 2:
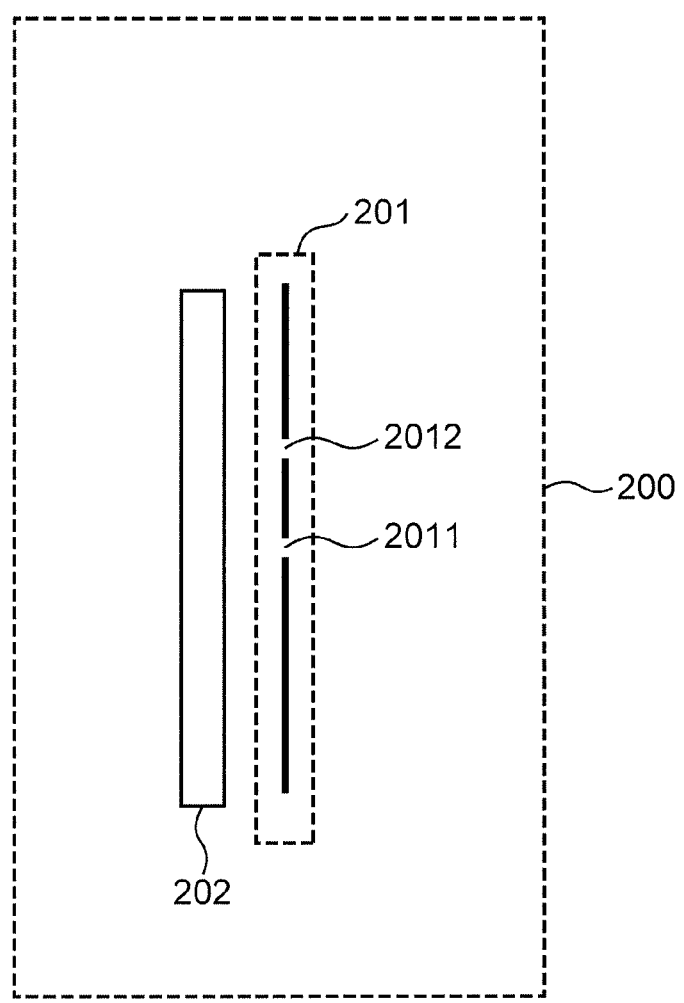
FIG. 2 is a view schematically illustrating a structure of a multi-pinhole camera as one example of an imaging device.

FIG. 2 is a view schematically illustrating a structure of a multi-pinhole camera 200 as one example of the imaging device 4. FIG. 2 is a top view of the multi-pinhole camera 200.

The multi-pinhole camera 200 illustrated in FIG. 2 includes a multi-pinhole mask 201 and an image sensor 202 such as a complementary metal oxide semiconductor (CMOS). The multi-pinhole camera 200 does not have a lens. The multi-pinhole mask 201 is disposed at a predetermined interval from the light receiving surface of the image sensor 202. The multi-pinhole mask 201 has a plurality of pinholes 2011 and 2012 arranged at random or at equal intervals. The pinholes 2011 and 2012 are also referred to as multi-pinholes. The image sensor 202 acquires captured images acquired by capturing an image displayed on the display device 3 through the pinholes 2011 and 2012. The image acquired through the pinholes is referred to as a pinhole image.

The pinhole image of the subject is different depending on the position and size of each of the pinholes 2011 and 2012. Therefore, the image sensor 202 acquires a superimposed image in a state where a plurality of pinhole images is superimposed in a slightly shifted manner (multiple image). The pinholes 2011 and 2012 have a positional relationship that affects a positional relationship among the pinhole images projected onto the image sensor 202 (i.e., a degree of superimposition of multiple images). The sizes of the pinholes 2011 and 2012 affect the degree of blurring of the pinhole images.

Using the multi-pinhole mask 201 enables acquiring a plurality of pinhole images each having a different position and a different degree of blurring while superimposing the images. That is, a computational image in which multiple images and blurring are intentionally created can be acquired. Thus, the captured image is a multiple and blurred image, whose blurring enables acquisition of an image in which privacy of a subject is protected.

In addition, by changing the number of pinholes, the positions of the pinholes, and the sizes of the pinholes, images with different degrees of blurring can be acquired. That is, the multi-pinhole mask 201 may be configured to be easily detachable by the user. A plurality of types of the multi-pinhole masks 201 having different mask patterns may be prepared in advance. The multi-pinhole mask 201 may be freely exchanged by the user depending on the mask pattern of a multi-pinhole camera used during image recognition.

Note that such a change of the multi-pinhole mask 201 can be achieved by the following various methods other than the replacement of the multi-pinhole mask 201. For example, the multi-pinhole mask 201 may be rotatably attached in front of the image sensor 202, or may be arbitrarily rotated by the user. Further, for example, the multi-pinhole mask 201 may be created by the user making a hole in an arbitrary place of a plate attached in from of the image sensor 202. The multi-pinhole mask 201 may be a liquid crystal mask using a spatial light modulator or the like. A predetermined number of pinholes may be formed at predetermined positions by arbitrarily setting the transmittance of positions in the multi-pinhole mask 201. Furthermore, for example, the multi-pinhole mask 201 may be formed by using a stretchable material such as rubber. The user may physically deform the multi-pinhole mask 201 to change the positions and the sizes of the pinholes by applying an external force.

Note that the multi-pinhole camera 200 is also used for image recognition using a trained machine learning model. The images captured by the multi-pinhole camera 200 are collected as training data. The collected training data is used for training the machine learning model.

Although in FIG. 2, the two pinholes 2011 and 2012 are arranged side by side in a horizontal direction, the present disclosure is not particularly limited thereto, and the multi-pinhole camera 200 may include three or more pinholes. In addition, the two pinholes 2011 and 2012 may be arranged in a vertical direction.

Specifically, the imaging control device 2 includes a microprocessor, a random access memory (RAM), a read only memory (ROM), a hard disk, and the like, not illustrated. The RAM, the ROM, or the hard disk stores a computer program, and the microprocessor operates in accordance with the computer program to implement functions of the imaging control device 2.

The imaging control device 2 includes a first storage part 21, a second storage part 22, an image acquiring part 23, a training image display control part 24, a correct answer information acquiring part 25, a correct answer image display control part 26, an imaging control part 27, a correct answer information generating part 28, and a storage control part 29.

The first storage part 21 stores a first training image of the machine learning model and first correct answer information associated with the first training image. The first storage part 21 stores a plurality of first training images captured by a normal camera and first correct answer information (annotation information) associated with each of the plurality of first training images. The first training image is an image including a subject that is a recognition target of the machine learning model. The first training image is an image without blurring, the image being acquired by another imaging device different from the imaging device 4.

The first correct answer information varies depending on identification tasks. For example, when the identification task is object detection, the first correct answer information is a bounding box representing a region occupied by a detection target in the image. In addition, for example, when the identification task is object identification, the first correct answer information is a classification result. Further, for example, when the identification task is region division in an image, the first correct answer information is region information on each pixel. The first training images and the first correct answer information stored in the first storage part 21 are the same as the information used in the machine learning of the identifier using a normal camera.

The image acquiring part 23 acquires the first training image of the machine learning model from the first storage part 21. The image acquiring part 23 outputs the first training image acquired from the first storage part 21 to the training image display control part 24.

The training image display control part 24 causes the display device 3 to display the first training image. The display device 3 displays the first training image in accordance with an instruction from the training image display control part 24.

The correct answer information acquiring part 25 acquires the first correct answer information associated with the first training image (training image) of the machine learning model from the first storage part 21. The correct answer information acquiring part 25 acquires first correct answer information associated with the first training image acquired by the image acquiring part 23. The correct answer information acquiring part 25 outputs the first correct answer information acquired from the first storage part 21 to the correct answer image display control part 26.

The correct answer image display control part 26 causes the display device 3 to display the first correct answer image based on the first correct answer information. The display device 3 displays the first correct answer image in accordance with an instruction from the correct answer image display control part 26.

The first correct answer image includes an object indicating a position of the first correct answer information in the image. For example, the object is a frame including an object to be detected. The frame has a rectangular shape and is also called a bounding box. The first correct answer information includes position information about the bounding box in the image. That is, the first correct answer information includes an x coordinate of an upper left vertex of the bounding box, a y coordinate of the upper left vertex of the bounding box, a width of the bounding box, and a height of the bounding box. Note that the position information is not limited to the above, and may be any information that can specify the position of the bounding box in the image. Further, the first correct answer information may include not only the position information about the bounding box but also the name (class name) of an object to be detected in the bounding box.

The imaging control part 27 causes the imaging device 4 to capture the first training image displayed on the display device 3, and acquires the second training image. When the first training image is displayed on the display device 3, the imaging control part 27 causes the imaging device 4 to capture the first training image and acquires the second training image. The imaging control part 27 outputs the acquired second training image to the storage control part 29.

Further, the imaging control part 27 causes the imaging device 4 to capture the first correct answer image displayed on the display device 3, and acquires the second correct answer image. When the first correct answer image is displayed on the display device 3, the imaging control part 27 causes the imaging device 4 to capture the first correct answer image and acquires the second correct answer image. The imaging control part 27 acquires the second correct answer image where a plurality of the bounding boxes (frames) is superimposed. The imaging control part 27 outputs the acquired second correct answer image to the correct answer information generating part 28.

The correct answer information generating part 28 generates the second correct answer information based on the second correct answer image acquired by the imaging control part 27. The correct answer information generating part 28 specifies a circumscribed bounding box circumscribing the plurality of the bounding boxes (frames) in the second correct answer image, and generates correct answer information represented by the specified circumscribed bounding box as the second correct answer information.

The storage control part 29 stores the data set including the set of the training image and the second correct answer information in the second storage part 22. The storage control part 29 stores the data set including the set of the second training image acquired by the imaging device 4 and the second correct answer information generated by the correct answer information generating part 28 in the second storage part 22.

The second storage part 22 stores the data set including the set of the second training image and the correct answer information.

Data set creation processing in the imaging control device 2 according to the first embodiment of the present disclosure will be described below.

Figure 3:
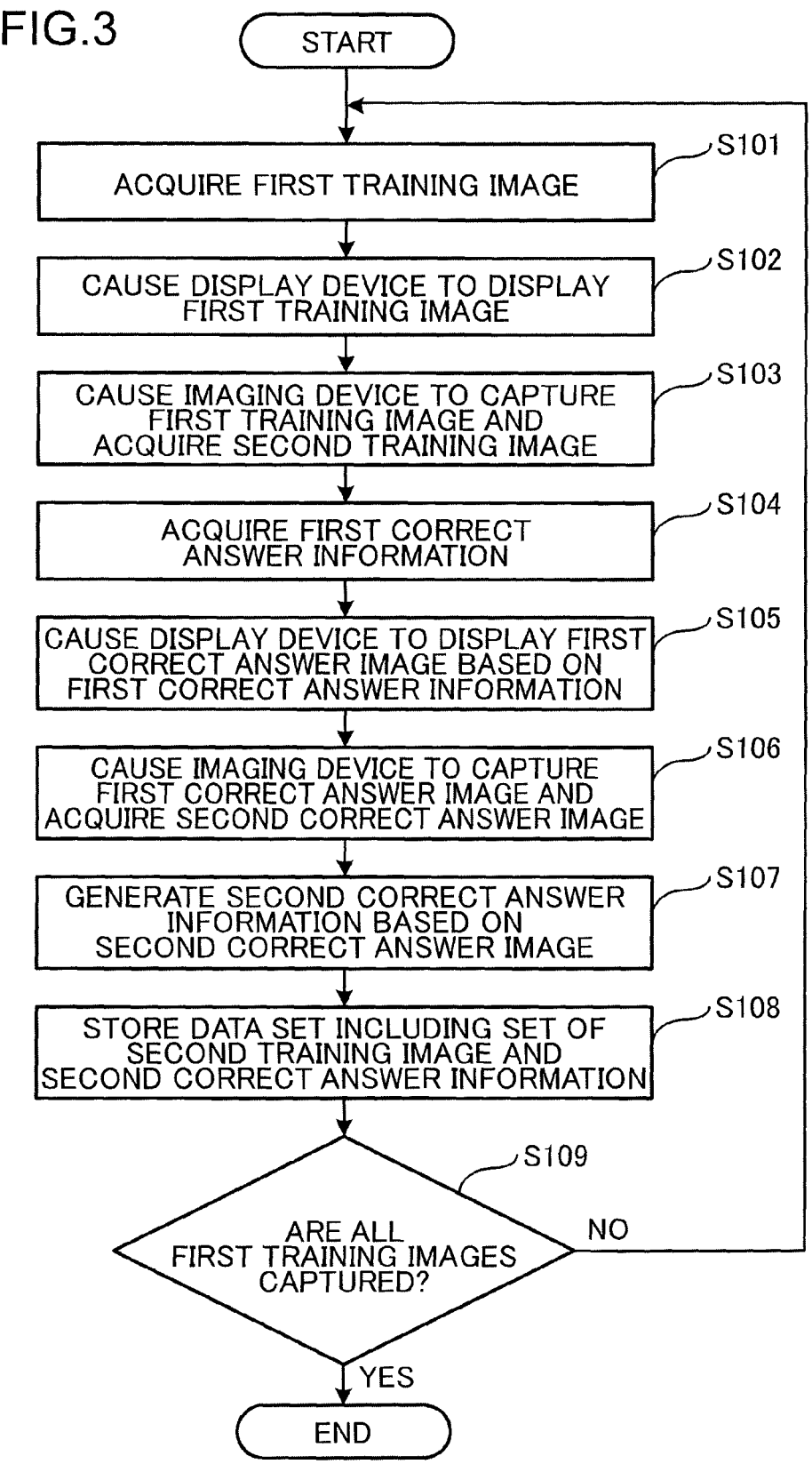
FIG. 3 is a flowchart for describing data set creation processing in an imaging control device according to the first embodiment of the present disclosure.

FIG. 3 is a flowchart for describing the data set creation processing in the imaging control device 2 according to the first embodiment of the present disclosure.

First, the image acquiring part 23 acquires a first training image from the first storage part 21 (step S101). The image acquiring part 23 acquires a first training image that is not captured from among a plurality of the first training images stored in the first storage part 21.

Then, the training image display control part 24 causes the display device 3 to display the first training image acquired by the image acquiring part 23 (step S102). The training image display control part 24 instructs the display device 3 on a display position and a display size of the first training image. At this time, the training image display control part 24 instructs the display device 3 on the display position and the display size of the first training image so that the image acquired by the imaging device 4 has the same size as the first training image.

The imaging control part 27 causes the imaging device 4 to capture the first training image displayed on the display device 3 and acquires a second training image (step S103). The imaging device 4 performs imaging so that the display device 3 enters the visual field.

Next, the correct answer information acquiring part 25 acquires first correct answer information corresponding to the displayed first training image from the first storage part 21 (step S104).

Then, the correct answer image display control part 26 causes the display device 3 to display a first correct answer image based on the first correct answer information acquired by the correct answer information acquiring part 25 (step S105). At this time, in a case where the position of the bounding box is represented in the same coordinate system as the first training image, the correct answer image display control part 26 may display, on the display device 3, the first correct answer image obtained by drawing a bounding box at the same position as the bounding box on the first training image. Details of the processing for displaying the first correct answer image will be described later.

Note that in the first embodiment, the first training image and the first correct answer image are displayed on the same display device 3, but the present disclosure is not particularly limited thereto, and the first training image and the first correct answer image may be displayed on different display devices.

The imaging control part 27 then causes the imaging device 4 to capture the first correct answer image displayed on the display device 3 and acquires a second correct answer image (step S106). The imaging device 4 performs imaging so that the display device 3 enters the visual field.

Thereafter, the correct answer information generating part 28 generates second correct answer information based on the second correct answer image acquired by the imaging control part 27 (step S107).

The imaging device 4 can acquire the second correct answer image for the blurred second training image acquired in step S103. In a case where the imaging device 4 is a multi-pinhole camera, one subject is imaged as multiple images through the multi-pinhole mask 201. The parallax, which is the amount of deviation of the multiple images, changes depending on the distance between the subject and the imaging device 4.

The parallax depending on the distance in the multi-pinhole camera will be described with reference to FIGS. 4 to 6.

Figure 4:
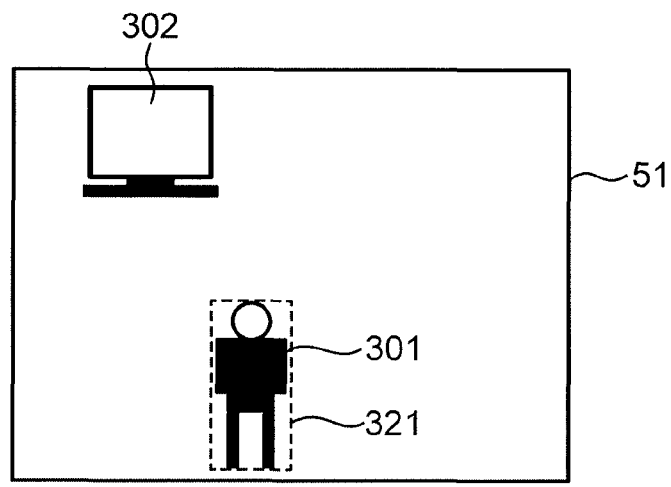
FIG. 4 is a diagram illustrating an example of a first training image displayed on a display device.

FIG. 4 is a diagram illustrating an example of a first training image displayed on the display device 3. FIG. 5 is a diagram illustrating an example of a second training image acquired by the imaging device 4 capturing the first training image illustrated in FIG. 4 in a case where a distance between the imaging device 4 and the display device 3 is L1. FIG. 6 is a diagram illustrating an example of a second training image acquired by the imaging device 4 capturing the first training image illustrated in FIG. 4 in a case where the distance between the imaging device 4 and the display device 3 is L2 (L1<L2).

A person 301 and a television 302 are seen in a first training image 51 illustrated in FIG. 4. Further, a bounding box 321 is set for the person 301 to be detected. The bounding box 321 is not included in the first training image 51 displayed on the display device 3.

Figure 5:
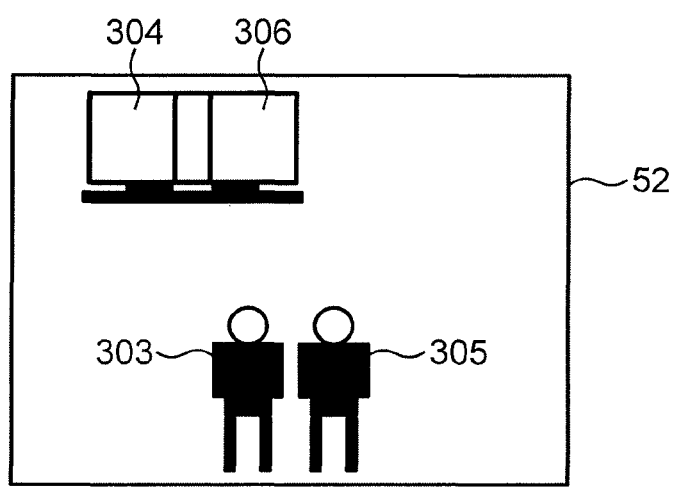
FIG. 5 is a diagram illustrating an example of a second training image acquired by causing an imaging device to capture the first training image illustrated in FIG. 4 in a case where the distance between the imaging device and the display device is L1.

A second training image 52 illustrated in FIG. 5 is acquired by the imaging device 4 with the two pinholes 2011 and 2012 capturing the first training image 51 illustrated in FIG. 4 in the case where the distance between the imaging device 4 and the display device 3 is L1. Further, a second training image 53 illustrated in FIG. 6 is acquired by the imaging device 4 with the two pinholes 2011 and 2012 capturing the first training image 51 illustrated in FIG. 4 in the case where the distance between the imaging device 4 and the display device 3 is L2. L1 is shorter than L2.

In the second training image 52 illustrated in FIG. 5, a person 303 is the person 301 in the first training image 51 captured through the pinhole 2011 on the optical axis, and a television 304 is the television 302 in the first training image 51 captured through the pinhole 2011 on the optical axis. A person 305 is the person 301 in the first training image 51 captured through the pinhole 2012 not on the optical axis, and a television 306 is the television 302 in the first training image 51 captured through the pinhole 2012 not on the optical axis.

Figure 6:
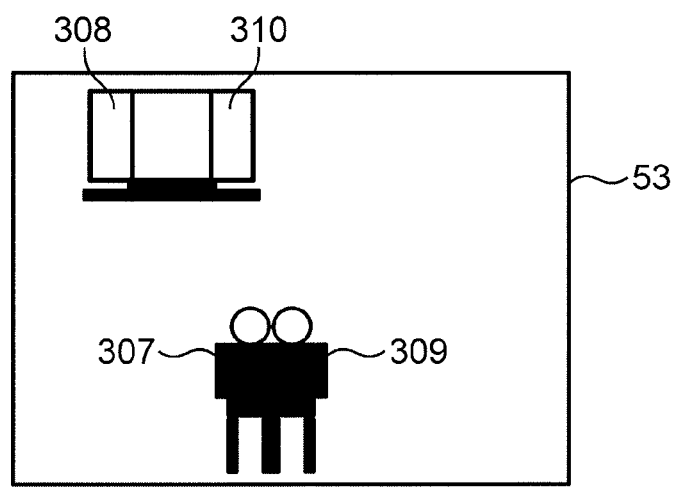
FIG. 6 is a diagram illustrating an example of the second training image acquired by causing the imaging device to capture the first training image illustrated in FIG. 4 in a case where the distance between the imaging device and the display device is L2 (L1<L2).

Further, in the second training image 53 illustrated in FIG. 6, a person 307 is the person 301 in the first training image 51 captured through the pinhole 2011 on the optical axis, and a television 308 is the television 302 in the first training image 51 captured through the pinhole 2011 on the optical axis. A person 309 is the person 301 in the first training image 51 captured through the pinhole 2012 not on the optical axis, and a television 310 is the television 302 in the first training image 51 captured through the pinhole 2012 not on the optical axis.

As described above, the second training image acquired from the imaging device 4 that is the multi-pinhole camera is an image where a plurality of subject images is superimposed. The positions and the sizes of the persons 303 and 307 and the televisions 304 and 308 imaged through the pinhole 2011 on the optical axis do not change on the captured image. On the other hand, the positions of the persons 305 and 309 and the televisions 306 and 310 imaged through the pinhole 2012 not on the optical axis change depending on the distance between the subject and the imaging device 4. As the distance between the subject and the imaging device 4 increases, the parallax amount decreases. That is, when the distance between the imaging device 4 and the display device 3 changes, the second training image where the parallax amount changes is acquired.

Figure 7:
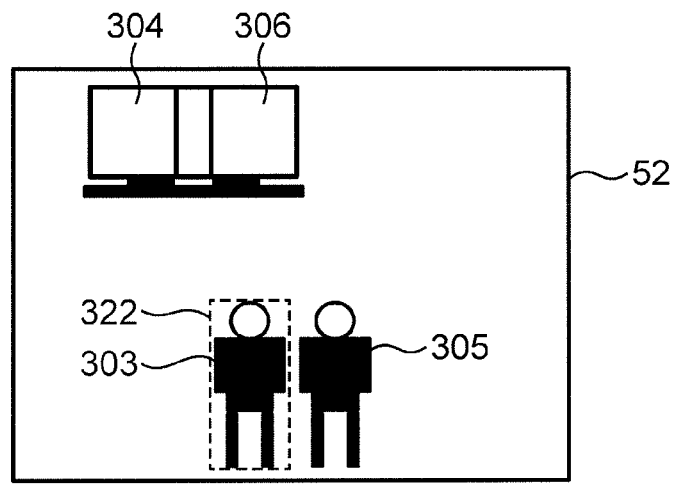
FIG. 7 is a diagram where a bounding box set in the first training image illustrated in FIG. 4 is superimposed on the second training image illustrated in FIG. 5.
Figure 8:
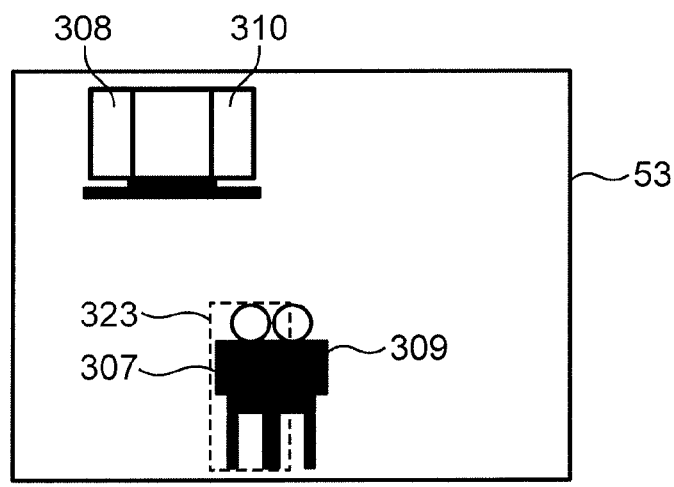
FIG. 8 is a diagram where the bounding box set in the first training image illustrated in FIG. 4 is superimposed on the second training image illustrated in FIG. 6.

FIG. 7 is a diagram where the bounding box 321 set in the first training image 51 illustrated in FIG. 4 is superimposed on the second training image 52 illustrated in FIG. 5, and FIG. 8 is a diagram where the bounding box 321 set in the first training image 51 illustrated in FIG. 4 is superimposed on the second training image 53 illustrated in FIG. 6.

The bounding box 322 illustrated in FIG. 7 and the bounding box 323 illustrated in FIG. 8 are superimposed at the same position as the bounding box 321 set in the first training image 51 illustrated in FIG. 4. The bounding box 322 and the bounding box 323 respectively include the person 303 and the person 307 imaged through the pinhole 2011 on the optical axis. Therefore, the bounding box 322 is correct answer information about the person 303 in the second training image 52, and the bounding box 323 is correct answer information about the person 307 in the second training image 53.

On the other hand, the bounding box 322 and the bounding box 323 respectively may not include the person 305 and the person 309 imaged through the pinhole 2012 not on the optical axis. Therefore, it can be seen that the bounding box 322 and the bounding box 323 are not correct answer information about the person 303 and the person 307 due to the influence of the parallax.

Figure 9:
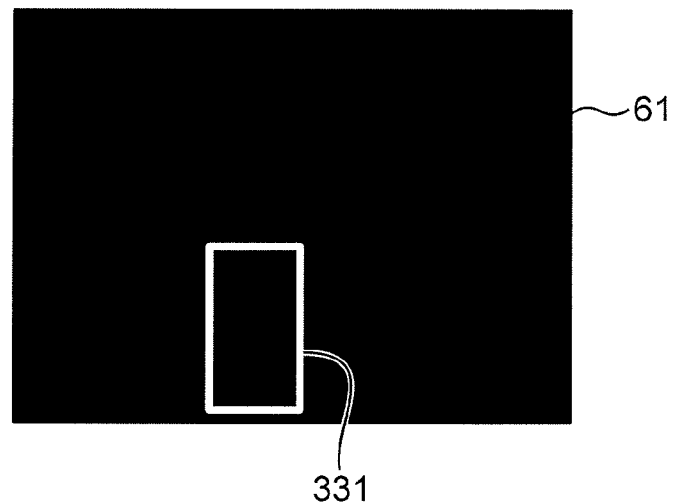
FIG. 9 is a diagram illustrating an example of a first correct answer image displayed on the display device in the first embodiment.
Figure 10:
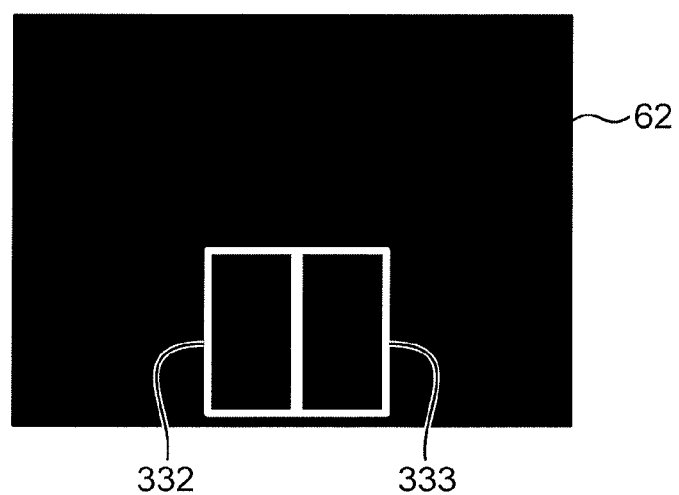
FIG. 10 is a diagram illustrating an example of a second correct answer image acquired by causing the imaging device to capture the first correct answer image illustrated in FIG. 9 in the case where the distance between the imaging device and the display device is L1.
Figure 11:
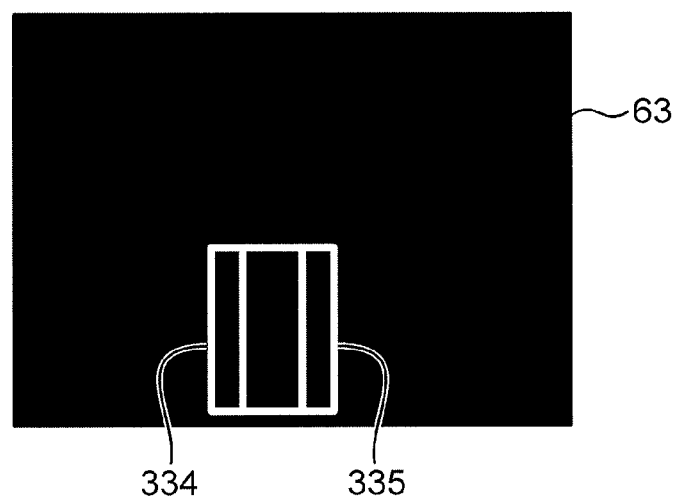
FIG. 11 is a diagram illustrating an example of the second correct answer image acquired by causing the imaging device to capture the first correct answer image illustrated in FIG. 9 in the case where the distance between the imaging device and the display device is L2 (L1<L2).

FIG. 9 is a diagram illustrating an example of the first correct answer image displayed on the display device 3 in the first embodiment. Further, FIG. 10 is a diagram illustrating an example of the second correct answer image obtained by the imaging device 4 capturing the first correct answer image illustrated in FIG. 9 in the case where the distance between the imaging device 4 and the display device 3 is L1. FIG. 11 is a diagram illustrating an example of the second correct answer image obtained by the imaging device 4 capturing the first correct answer image illustrated in FIG. 9 in the case where the distance between the imaging device 4 and the display device 3 is L2 (L1<L2).

A first correct answer image 61 illustrated in FIG. 9 includes a bounding box 331 which is an example of an object. The bounding box 331 is a rectangular frame that surrounds the person 301 of the first training image 51 illustrated in FIG. 4 as a detection target. The bounding box 331 is displayed on the first correct answer image 61 having the same size as the first training image 51 displayed on the display device 3.

Furthermore, in a second correct answer image 62 illustrated in FIG. 10, a bounding box 332 is the bounding box 331 imaged through the pinhole 2011 on the optical axis, and a bounding box 333 is the hounding box 331 imaged through the pinhole 2012 not on the optical axis.

Further, in a second correct answer image 63 illustrated in FIG. 11, a bounding box 334 is the bounding box 331 imaged through the pinhole 2011 on the optical axis, and a bounding box 335 is the bounding box 331 imaged through the pinhole 2012 not on the optical axis.

As described above, the second correct answer images 62 and 63 acquired from the imaging device 4 that is the multi-pinhole camera are images where a plurality of images (bounding boxes) is superimposed. The positions and the sizes of the bounding boxes 332 and 334 imaged through the pinhole 2011 on the optical axis in the second correct answer image do not change. On the other hand, the positions of the bounding boxes 333 and 335 imaged through the pinhole 2012 not on the optical axis in the second correct answer image change depending on the distance between the subject and the imaging device 4. As the distance between the subject and the imaging device 4 increases, the parallax amount decreases. That is, when the distance between the imaging device 4 and the display device 3 changes, the bounding box where the parallax amount changes is acquired.

The correct answer information generating part 28 executes binarization processing, edge detection processing, or filtering processing using luminance on the acquired second correct answer image to detect boundaries of a plurality of bounding boxes in the second correct answer image. The correct answer information generating part 28 specifies a rectangular circumscribed bounding box circumscribing the plurality of the bounding boxes in the second correct answer image, and generates correct answer information represented by the specified circumscribed bounding box, as the second correct answer information. Note that the correct answer information generating part 28 may specify a rectangular inscribed bounding box inscribing the plurality of the bounding boxes in the second correct answer image, and generate correct answer information represented by the specified inscribed bounding box, as the second correct answer information.

Next, the rectangular circumscribed bounding box circumscribing the plurality of bounding boxes will be described with reference to FIGS. 12 and 13.

Figure 12:
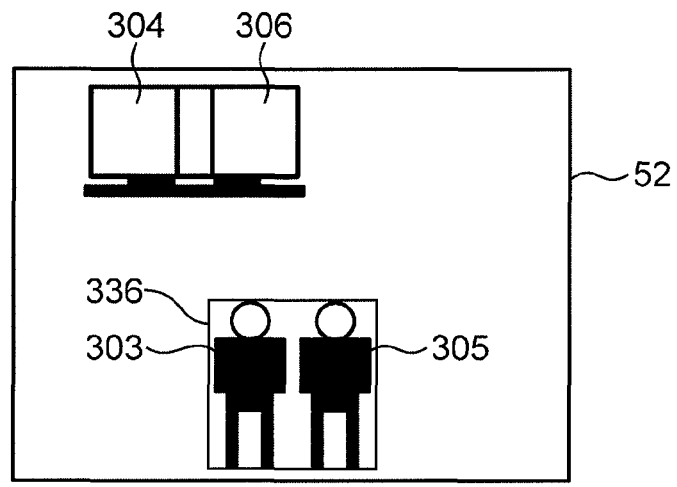
FIG. 12 is a diagram where a circumscribed bounding box is superimposed on the second training image illustrated in FIG. 5.
Figure 13:
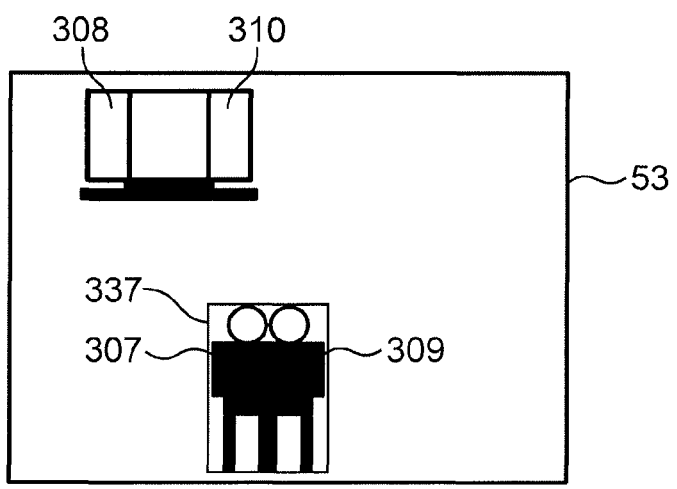
FIG. 13 is a diagram where a circumscribed bounding box is superimposed on the second training image illustrated in FIG. 6.

FIG. 12 is a diagram where a circumscribed bounding box 336 is superimposed on the second training image 52 illustrated in FIG. 5, and FIG. 13 is a diagram where a circumscribed bounding box 337 is superimposed on the second training image illustrated in FIG. 6.

The circumscribed bounding box 336 illustrated in FIG. 12 is a frame circumscribing the two bounding boxes 332 and 333 illustrated in FIG. 10, and the circumscribed bounding box 337 illustrated in FIG. 13 is a frame circumscribing the two bounding boxes 334 and 335 illustrated in FIG. 11.

The correct answer information generating part 28 specifies the rectangular circumscribed bounding box 336 circumscribing the plurality of bounding boxes 332 and 333. The circumscribed bounding box 336 is correct answer information including the person 303 imaged through the pinhole 2011 on the optical axis and the person 305 imaged through the pinhole 2012 not on the optical axis. The correct answer information generating part 28 generates correct answer information represented by the specified circumscribed bounding box 336, as the second correct answer information.

In addition, the correct answer information generating part 28 specifies a rectangular circumscribed bounding box 337 circumscribing the plurality of bounding boxes 334 and

335. The circumscribed bounding box 337 is correct answer information including the person 307 imaged through the pinhole 2011 on the optical axis and the person 309 imaged through the pinhole 2012 not on the optical axis. The correct answer information generating part 28 generates correct answer information represented by the specified circumscribed bounding box 337, as the second correct answer information.

As described above, the imaging system 1 according to the first embodiment acquires the second training image and the second correct answer image captured by the imaging device 4, and generates the second correct answer information corresponding to the second training image based on the second correct answer image, thereby acquiring the second correct answer information appropriate for the parallax. Therefore, a more accurate data set can be structured, and the recognition accuracy of the machine learning model can be improved.

Returning to FIG. 3, the storage control part 29 stores the data set including the set of the second training image acquired by the imaging device 4 and the second correct answer information generated by the correct answer information generating part 28 in the second storage part 22 (step S108). As a result, the second storage part 22 stores the data set including the set of the second training image acquired by the imaging device 4 and the correct answer information thereof.

The image acquiring part 23 determines whether the imaging device 4 has captured all the first training images stored in the first storage part 21 (step S109). Here, in a case where a determination is made that the imaging device 4 has not captured all the first training images (NO in step S109), the processing returns to step S101, and the image acquiring part 23 acquires a first training image that has not been captured from among the plurality of first training images stored in the first storage part 21. Then, the training image display control part 24 causes the display device 3 to display the first training image, and the imaging control part 27 causes the imaging device 4 to capture the displayed first training image. Further, the correct answer information acquiring part 25 acquires the first correct answer information corresponding to the first training image. Then, the correct answer image display control part 26 causes the display device 3 to display the first correct answer image based on the first correct answer information, and the imaging control part 27 causes the imaging device 4 to capture the displayed first correct answer image.

On the other hand, in a case where the determination is made that the imaging device 4 has captured all the first training images (YES in step S109), the processing ends.

Note that in the first embodiment, the correct answer information generating part 28 specifies a circumscribed bounding box circumscribing the plurality of the bounding boxes in the second correct answer image, and generates correct answer information represented by the specified circumscribed bounding box, as the second correct answer information, but the present disclosure is not limited thereto. The correct answer information generating part 28 may select one bounding box from the plurality of bounding boxes in the second correct answer image based on the luminance or the position of each of the plurality of bounding boxes (frames), and generate correct answer information represented by the selected one bounding box, as the second correct answer information.

More specifically, the correct answer information generating part 28 may calculate average luminance of each of the plurality of bounding boxes in the second correct answer image, select one bounding box having the highest calculated average luminance, and generate correct answer information represented by the selected one bounding box, as the second correct answer information.

In addition, the correct answer information generating part 28 may specify a circumscribed bounding box circumscribing the plurality of bounding boxes in the second correct answer image, select one bounding box having a center closest to a center of the specified circumscribed bounding box, and generate correct answer information represented by the selected one bounding box, as the second correct answer information. Note that the center of the bounding box is the center of gravity of a rectangular bounding box, and is an intersection of two diagonal lines of the rectangular bounding box.

Further, the correct answer information generating part 28 may specify a circumscribed bounding box circumscribing the plurality of bounding boxes in the second correct answer image, determine a center of the specified circumscribed bounding box as a reference position in an image, and generate correct answer information whose center is the determined reference position and whose size is identical to the bounding box, as the second correct answer information.

In the above description, the correct answer image display control part 26 displays the first correct answer image including the bounding box represented by the rectangular frame, but may display the first correct answer image including a bounding box represented by a rectangular region. Hereinafter, a modification of the first embodiment where the first correct answer image including the rectangular bounding box region is displayed will be described.

Figure 14:
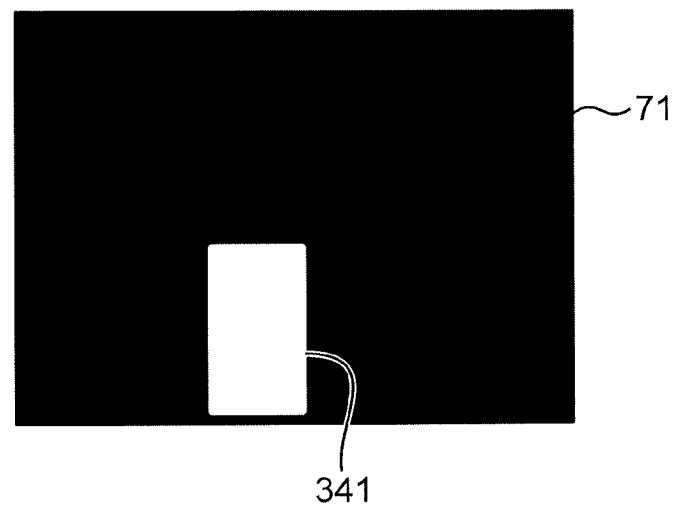
FIG. 14 is a diagram illustrating an example of the first correct answer image displayed on the display device in a modification of the first embodiment.
Figure 15:
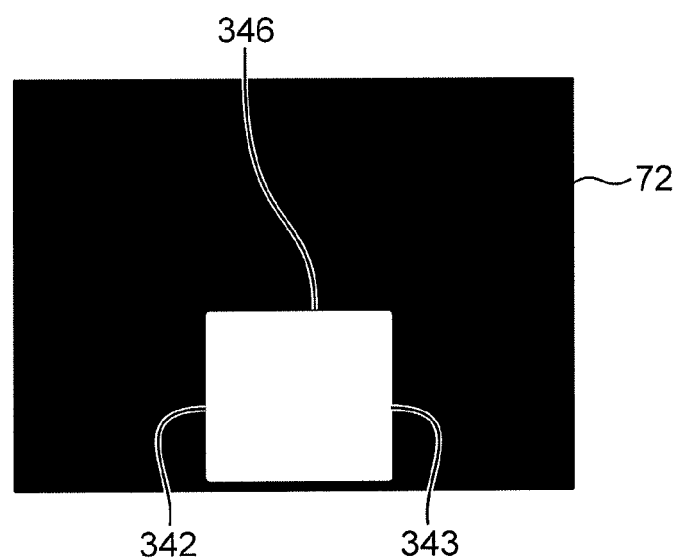
FIG. 15 is a diagram illustrating an example of the second correct answer image acquired by causing the imaging device to capture the first correct answer image illustrated in FIG. 14 in the case where the distance between the imaging device and the display device is L1.
Figure 16:
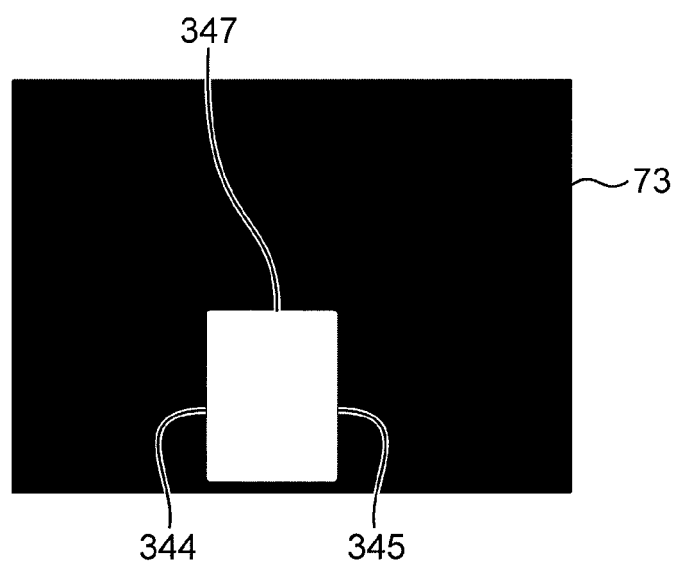
FIG. 16 is a diagram illustrating an example of the second correct answer image acquired by causing the imaging device to capture the first correct answer image illustrated in FIG. 14 in the case where the distance between the imaging device and the display device is L2 (L1<L2).

FIG. 14 is a diagram illustrating an example of the first correct answer image displayed on the display device 3 in the modification of the first embodiment. Further, FIG. 15 is a diagram illustrating an example of a second correct answer image acquired by the imaging device 4 capturing the first correct answer image illustrated in FIG. 14 in the case where the distance between the imaging device 4 and the display device 3 is L1. FIG. 16 is a diagram illustrating an example of a second correct answer image acquired by the imaging device 4 capturing the first correct answer image illustrated in FIG. 14 in the case where the distance between the imaging device 4 and the display device 3 is L2 (L1<L2).

A first correct answer image 71 illustrated in FIG. 14 includes a first bounding box region 341 which is an example of an object. The first bounding box region 341 is a rectangular region including the person 301 of the first training image 51 illustrated in FIG. 4 as a detection target. The first bounding box region 341 is a region where the frame of the bounding box of the first correct answer information has predetermined luminance or is filled with a predetermined color. The first bounding box region 341 is displayed on the first correct answer image 71 having the same size as the first training image 51 displayed on the display device 3.

Further, in a second correct answer image 72 illustrated in FIG. 15, a first bounding box region 342 is the first bounding box region 341 imaged through the pinhole 2011 on the optical axis, and a first bounding box region 343 is the first bounding box region 341 imaged through the pinhole 2012 not on the optical axis.

Further, in a second correct answer image 73 illustrated in FIG. 16, a first bounding box region 344 is the first bounding box region 341 imaged through the pinhole 2011 on the optical axis, and a first bounding box region 345 is the first bounding box region 341 imaged through the pinhole 2012 not on the optical axis.

In the modification of the first embodiment, the correct answer information generating part 28 may specify a circumscribed frame of the second bounding box region where the plurality of first bounding box regions is superimposed in the second correct answer image, and generate correct answer information represented by the specified circumscribed frame, as the second correct answer information.

As described above, the second correct answer images 72 and 73 acquired from the imaging device 4 that is the multi-pinhole camera are images where a plurality of images is superimposed. The positions and the sizes of the first bounding box regions 342 and 344 imaged through the pinhole 2011 on the optical axis in the second correct answer image do not change. On the other hand, the positions of the first bounding box regions 343 and 345 imaged through the pinhole 2012 not on the optical axis in the second correct answer image change depending on the distance between the subject and the imaging device 4. As the distance between the subject and the imaging device 4 increases, the parallax amount decreases. That is, when the distance between the imaging device 4 and the display device 3 changes, a bounding box region where the parallax amount changes is acquired.

The correct answer information generating part 28 executes edge detection processing on the acquired second correct answer image 72 to detect a boundary of a second bounding box region 346 where the plurality of first bounding box regions 342 and 343 is superimposed in the second correct answer image 72. The correct answer information generating part 28 specifies a rectangular circumscribed bounding box circumscribing the second bounding box region 346, and generates correct answer information represented by the specified circumscribed bounding box as the second correct answer information.

The correct answer information generating part 28 executes the edge detection processing on the acquired second correct answer image 73 to detect a boundary of a second bounding box region 347 where the plurality of first bounding box regions 344 and 345 is superimposed in the second correct answer image 73. The correct answer information generating part 28 then specifies a rectangular circumscribed bounding box circumscribing the second bounding box region 347, and generates correct answer information represented by the specified circumscribed bounding box as the second correct answer information.

Note that the correct answer information generating part 28 may execute, for example, binarization processing instead of the edge detection processing to detect the boundaries of the second bounding box regions 346 and 347. Note that the correct answer information generating part 28 may specify a rectangular inscribed bounding box inscribing the second bounding box regions 346 and 347, and generate correct answer information represented by the specified inscribed bounding box as the second correct answer information.

Figure 17:
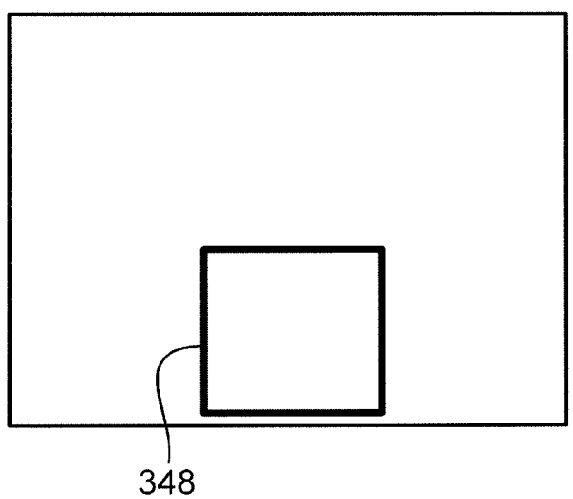
FIG. 17 is a diagram illustrating an example of a rectangular circumscribed bounding box circumscribing a second bounding box region illustrated in FIG. 15.
Figure 18:
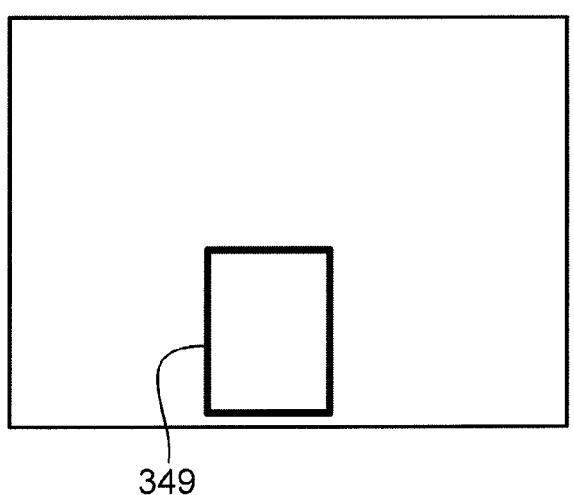
FIG. 18 is a diagram illustrating an example of a rectangular circumscribed bounding box circumscribing a second bounding box region illustrated in FIG. 16.

FIG. 17 is a diagram illustrating an example of a rectangular circumscribed bounding box circumscribing the second bounding box region 346 illustrated in FIG. 15, and FIG. 18 is a diagram illustrating an example of a rectangular circumscribed bounding box circumscribing the second bounding box region 347 illustrated in FIG. 16.

The correct answer information generating part 28 detects an edge of the second bounding box region 346 illustrated in FIG. 15 to specify a circumscribed bounding box 348 illustrated in FIG. 17. Further, the correct answer information generating part 28 detects an edge of the second bounding box region 347 illustrated in FIG. 16 to specify a circumscribed bounding box 349 illustrated in FIG. 18.

Figure 19:
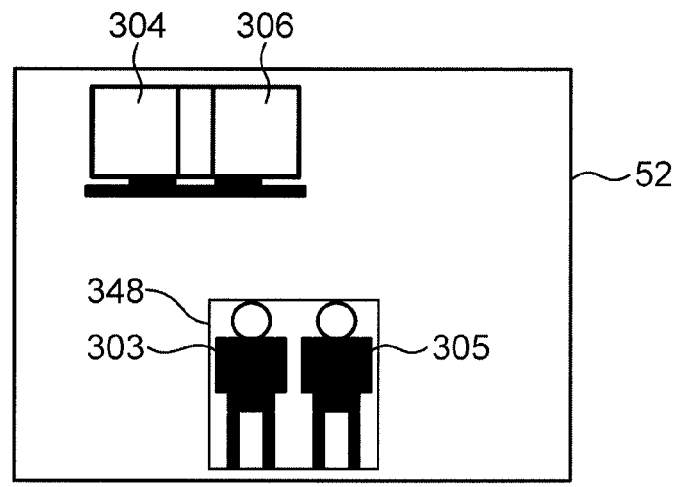
FIG. 19 is a diagram where the circumscribed bounding box illustrated in FIG. 17 is superimposed on the second training image illustrated in FIG. 5.
Figure 20:
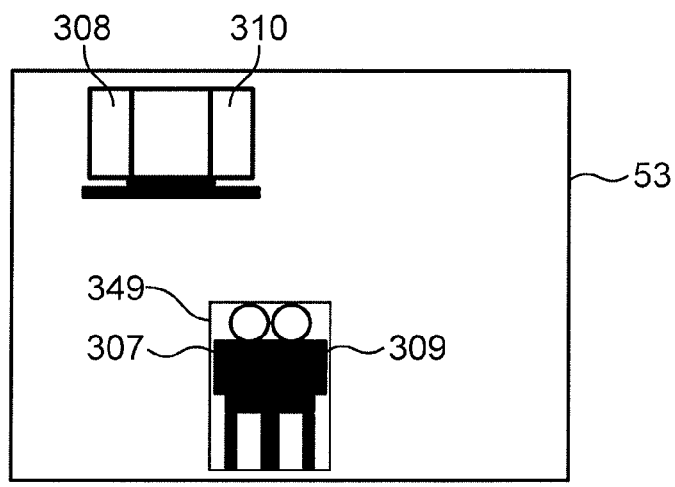
FIG. 20 is a diagram where the circumscribed bounding box illustrated in FIG. 18 is superimposed on the second training image illustrated in FIG. 6.

FIG. 19 is a diagram where the circumscribed bounding box 348 illustrated in FIG. 17 is superimposed on the second training image illustrated in FIG. 5, and FIG. 20 is a diagram where the circumscribed bounding box 349 illustrated in FIG. 18 is superimposed on the second training image illustrated in FIG. 6.

The circumscribed bounding box 348 illustrated in FIG. 19 is correct answer information including the person 303 imaged through the pinhole 2011 on the optical axis and the person 305 imaged through the pinhole 2012 not on the optical axis. The correct answer information generating part 28 generates correct answer information represented by the specified circumscribed bounding box 348, as the second correct answer information.

Further, the circumscribed bounding box 349 illustrated in FIG. 20 is correct answer information including the person 307 imaged through the pinhole 2011 on the optical axis and the person 309 imaged through the pinhole 2012 not on the optical axis. The correct answer information generating part 28 generates the correct answer information represented by the specified circumscribed bounding box 349, as the second correct answer information.

Note that in the modification of the first embodiment, the correct answer information generating part 28 specifies a circumscribed bounding box circumscribing the second bounding box region where the plurality of first bounding box regions is superimposed in the second correct answer image, and generates correct answer information represented by the specified circumscribed bounding box as the second correct answer information, but the present disclosure is not particularly limited thereto. The correct answer information generating part 28 may determine a reference position in an image based on luminance of the second bounding box region where the plurality of first bounding box regions is superimposed in the second correct answer image, and generate correct answer information whose center is the determined reference position and whose size is identical to the first bounding box region, as the second correct answer information.

More specifically, the correct answer information generating part 28 may determine a pixel having the maximum luminance value in the second bounding box region in the second correct answer image, as a reference position, and generate correct answer information whose center is the determined reference position and whose size is identical to the first bounding box region, as the second correct answer information.

In addition, the correct answer information generating part 28 may specify a circumscribed bounding box circumscribing the second bounding box region where a plurality of first bounding box regions is superimposed in the second correct answer image, determine a center of the specified circumscribed bounding box as a reference position in an image, and generate correct answer information whose center is the determined reference position and whose size is identical to the first bounding box region, as the second correct answer information.

Further, for example, in a case where the pinholes are spaced apart from each other, the second bounding box region may not be imaged as one region, but may be imaged as a plurality of regions. In this case, the correct answer information generating part 28 may specify a region including a plurality of bounding box regions (objects) in the second correct answer image, and generate correct answer information represented by the specified region, as the second correct answer information.

In the above description, the example where the identification task is the object detection and the first correct answer information is the bounding box has been described, but the first correct answer information used by the imaging system 1 of the first embodiment is not limited thereto. For example, the identification task may be pixel-by-pixel region division, such as semantic segmentation. In this case, the correct answer image display control part 26 may sequentially display the first correct answer image based on the first correct answer information for each class. For example, in a case where the semantic segmentation is a task of classifying an outdoor image into three classes of a road, sky, and a building, the correct answer image display control part 26 may first causes the display device to display a first correct answer image where pixels corresponding to the road are expressed in white and pixels corresponding to portions other than the road are expressed in black, and cause the imaging device 4 to capture the first correct answer image. Next, the correct answer image display control part 26 may cause the display device 3 to display the first correct answer image where the pixels corresponding to the sky are expressed in white and the pixels corresponding to the portions other than the sky are expressed in black, and cause the imaging device 4 to capture the first correct answer image. Finally, the correct answer image display control part 26 may cause the display device 3 to display a first correct answer image where pixels corresponding to a building are expressed in white and pixels corresponding to portions other than the building are expressed in black, and cause the imaging device 4 to capture the first correct answer image. In this way, the second correct answer image can be acquired for each class.

As described above, in the first embodiment, the first correct answer image based on the first correct answer information corresponding to the training image of the machine learning model is displayed on the display device 3. Then, the imaging device 4 that acquires a blurred image captures the first correct answer image displayed on the display device 3 and, the second correct answer image is acquired. The second correct answer information is generated based on the acquired second correct answer image. Then, the data set including the set of the training image and the second correct answer information is stored in the second storage part 22.

Therefore, since the accurate second correct answer information depending on the degree of blurring of the imaging device 4 can be generated and the data set including the set of the training image and the second correct answer information can be accumulated, the recognition accuracy of the machine learning model can be improved while the privacy of a subject is protected.

Further, since the imaging system 1 according to the first embodiment can acquire the correct answer information appropriate for the parallax, a more accurate data set can be structured, and the recognition accuracy of the machine learning model can be improved.

Second Embodiment

The imaging control device 2 of the first embodiment causes the display device 3 to display a first correct answer image based on first correct answer information corresponding to a first training image, causes the imaging device 4 to capture the displayed first correct answer image and acquires a second correct answer image, and generates second correct answer information based on the acquired second correct answer image. On the contrary, an imaging control device according to a second embodiment causes the display device 3 to display a first geometric image, causes the imaging device 4 to capture the displayed first geometric image and acquires a second geometric image, generates a conversion table for converting the first geometric image to the second geometric image, and converts first correct answer information to second correct answer information using the generated conversion table.

Figure 21:
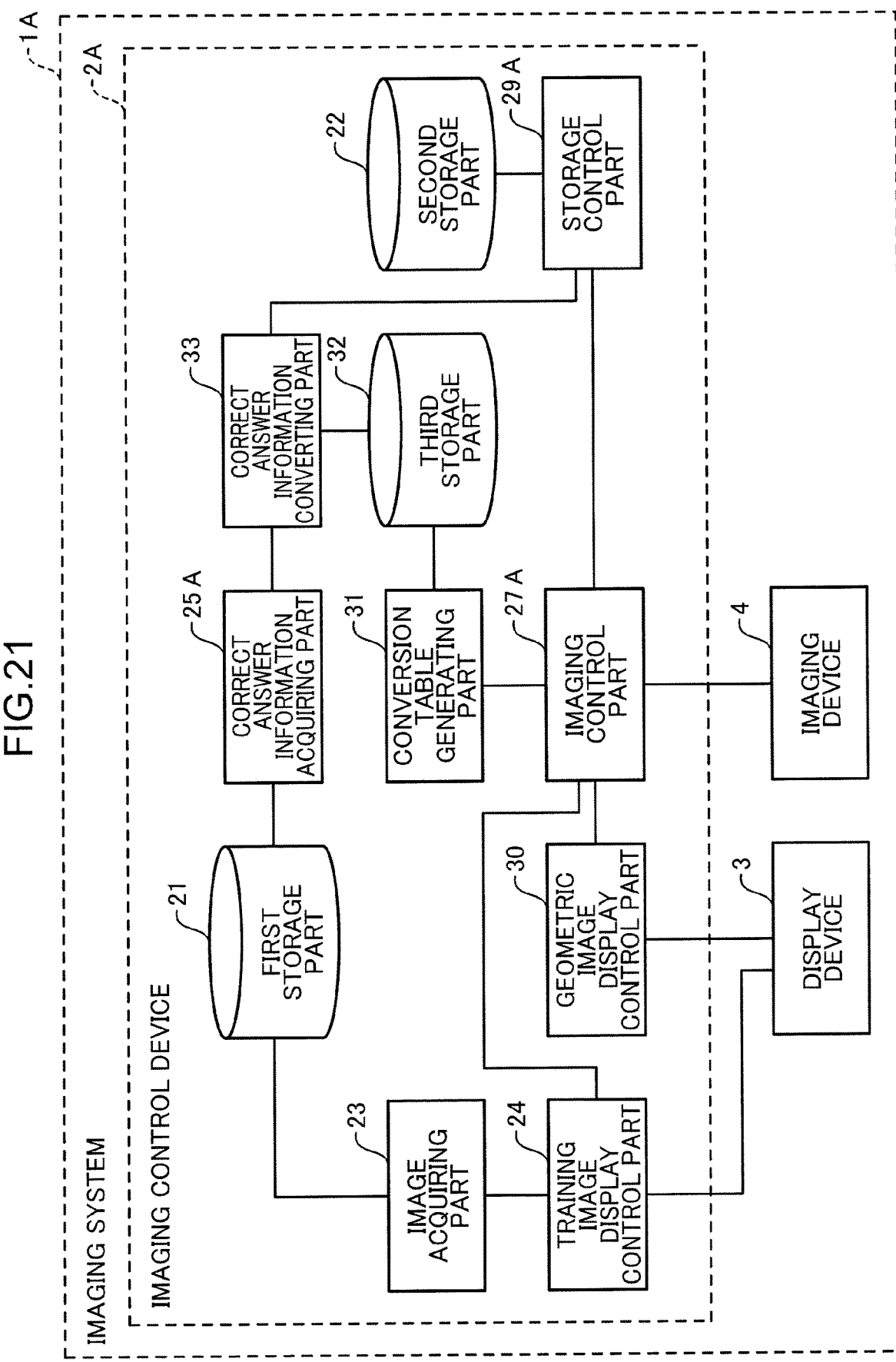
FIG. 21 is a block diagram illustrating an example of an overall configuration of an imaging system according to a second embodiment of the present disclosure.

FIG. 21 is a block diagram illustrating an example of an overall configuration of an imaging system 1A according to the second embodiment of the present disclosure. In FIG. 21, the same components as those in FIG. 1 are denoted by the same reference numerals, and description thereof is omitted.

The imaging system 1A includes an imaging control device 2A, the display device 3, and the imaging device 4.

The imaging control device 2A includes a first storage part 21, a second storage part 22, an image acquiring part 23, a training image display control part 24, a correct answer information acquiring part 25A, an imaging control part 27A, a storage control part 29A, a geometric image display control part 30, a conversion table generating part 31, a third storage part 32, and a correct answer information converting part 33.

The geometric image display control part 30 causes the display device 3 to display a first geometric image. The first geometric image includes a first dot provided at a predetermined position in an image.

The imaging control part 27A causes the imaging device 4 to capture the first geometric image displayed on the display device 3, and acquires a second geometric image. The second geometric image includes a plurality of second dots superimposed by imaging the first dot.

The conversion table generating part 31 generates a conversion table for converting the position of the first geometric image to the position of the second geometric image. The conversion table generating part 31 specifies the positions of the plurality of second dots in the second geometric image, and generates a conversion table for converting the position of the first dot to the specified positions of the plurality of second dots.

The third storage part 32 stores the conversion table generated by the conversion table generating part 31.

The correct answer information acquiring part 25A acquires first correct answer information corresponding to a first training image acquired by the image acquiring part 23. The correct answer information acquiring part 25A outputs the first correct answer information acquired from the first storage part 21 to the correct answer information converting part 33.

The correct answer information converting part 33 converts the first correct answer information acquired by the correct answer information acquiring part 25A to the second correct answer information using the conversion table stored in the third storage part 32. The second correct answer information is correct answer information corresponding to a second training image.

The storage control part 29A stores a data set including a set of the second training image acquired by the imaging device 4 and the second correct answer information converted by the correct answer information converting part 33 in the second storage part 22.

Data set creation processing in the imaging control device 2A according to the second embodiment of the present disclosure will be described below.

Figure 22:
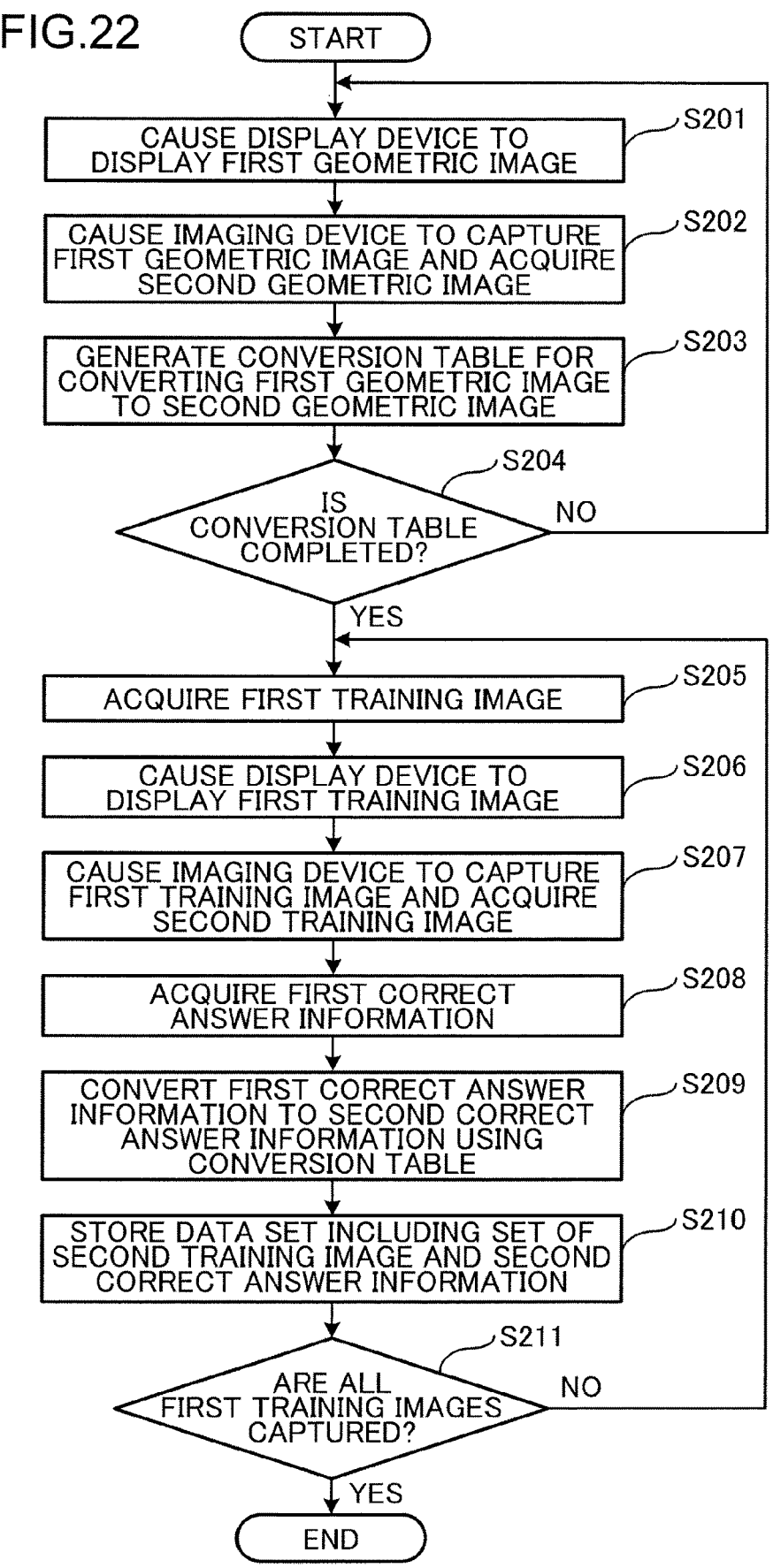
FIG. 22 is a flowchart for describing data set creation processing in an imaging control device according to the second embodiment of the present disclosure.

FIG. 22 is a flowchart for describing data set creation processing in the imaging control device 2A according to the second embodiment of the present disclosure.

First, the geometric image display control part 30 causes the display device 3 to display the first geometric image (step S201). That is, in a case where the display image of the display device 3 is expressed by coordinates (u, v) (0≤u≤N, 0≤v≤M), the geometric image display control part 30 displays the first geometric image where only one pixel in the coordinates (u, v) is expressed in white and the other pixels are expressed in black.

Figure 23:
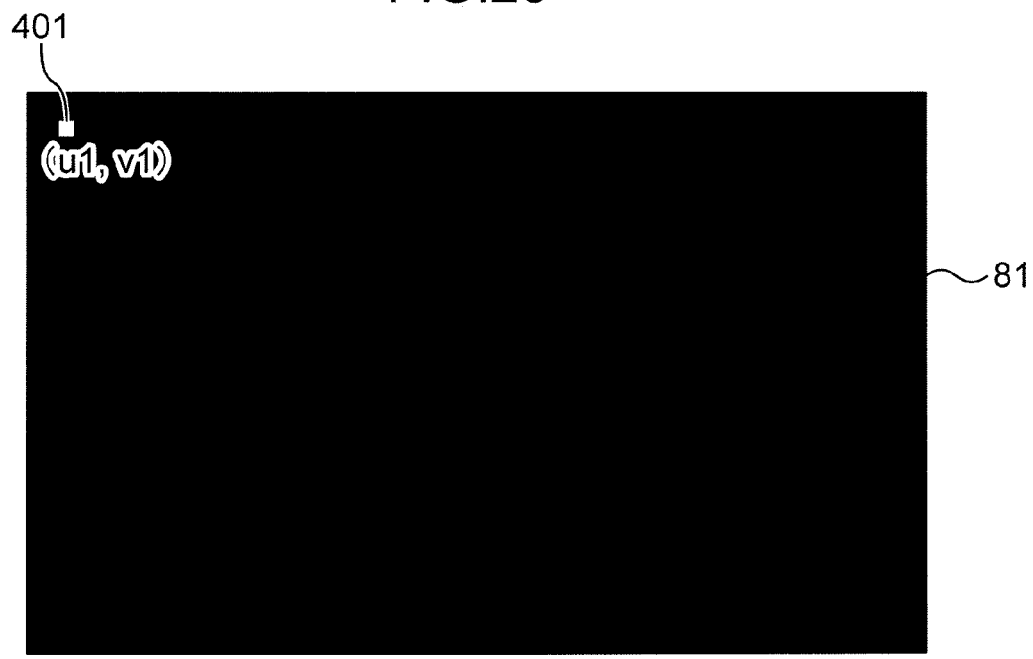
FIG. 23 is a diagram illustrating an example of a first geometric image displayed on the display device in the second embodiment.

FIG. 23 is a diagram illustrating an example of the first geometric image displayed on the display device 3 in the second embodiment.

As illustrated in FIG. 23, the geometric image display control part 30 causes the display device to display a first geometric image 81 where only a first dot 401 corresponding to coordinates (u1, v1) as one of the plurality of pixels is expressed in white. Pixels other than the first dot 401 are black. First, the geometric image display control part 30 causes the display device 3 to display the first geometric image 81 where only the first dot 401 corresponding to the upper left pixel is expressed in white. Note that the first dot 401 may not be structured by one pixel, but structured by a plurality of pixels such as four pixels or nine pixels.

Returning to FIG. 22, the imaging control part 27A causes the imaging device 4 to capture the first geometric image displayed on the display device 3 and acquires a second geometric image (step S202). When the first geometric image is displayed on the display device 3, the imaging control part 27A causes the imaging device 4 to capture the first geometric image and acquires the second geometric image. The imaging control part 27A outputs the acquired second geometric image to the conversion table generating part 31. The imaging control part 27A performs imaging so that the display device 3 enters the visual field.

Next, the conversion table generating part 31 generates a conversion table for converting the first geometric image to the second geometric image (step S203). The conversion table generating part 31 stores the generated conversion table in the third storage part 32.

Figure 24:
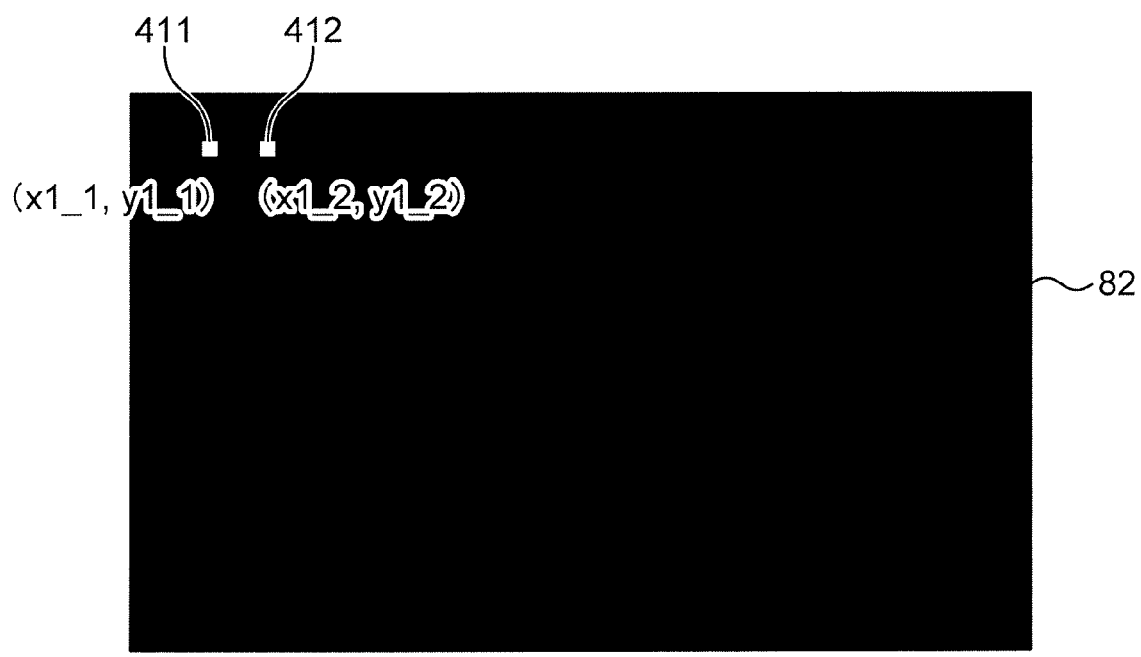
FIG. 24 is a diagram illustrating an example of a second geometric image acquired by causing the imaging device to capture the first geometric image illustrated in FIG. 23.

FIG. 24 is a diagram illustrating an example of the second geometric image acquired by causing the imaging device 4 to capture the first geometric image illustrated in FIG. 23.

In a second geometric image 82 illustrated in FIG. 24, a second dot 411 is the first dot 401 imaged through the pinhole 2011 on the optical axis, and a second dot 412 is the first dot 401 imaged through the pinhole 2012 not on the optical axis. That is, the first dot 401 in the first geometric image 81 is affected by the parallax due to the imaging device 4, and is converted to the plurality of second dots 411 and 412 in the second geometric image 82.

The conversion table generating part 31 specifies the pixel positions (x, y) of the plurality of second dots 411 and 412 in the second geometric image 82. Then, the conversion table generating part 31 generates a conversion table for converting the pixel position (u, v) of the first dot 401 in the first geometric image 81 to the pixel positions (x, y) of the plurality of second dots 411 and 412 of the second geometric image 82. As illustrated in FIG. 24, the first dot 401 at the coordinates (u1, v1) displayed on display device 3 is imaged as two luminous points of the second dot 411 at coordinates (x1_1, y1_1) and the second dot 412 at coordinates (x1_2, y1_2).

As a result, the conversion table generating part 31 can generate a conversion table for converting the coordinates (u, v) of the first correct answer information stored in the first storage part 21 to the coordinates (x, y) of the second correct answer information captured by the imaging device 4.

Note that the second dot 411 and the second dot 412 in the second geometric image 82 each may include a single dot or a plurality of dots. When the size of the pinholes are sufficiently large, the second dot 411 and the second dot 412 become a plurality of dots having spread. In this case, the conversion table generating part 31 may specify the positions of all the dots as the positions of the second dot 411 and the second dot 412. For example, the conversion table generating part 31 may specify the position of a dot that has a local maximum luminance value that is a greatest luminance value among the plurality of dots having spread, as each position of the second dot 411 and the second dot 412.

Next, the conversion table generating part 31 determines whether the conversion table is completed (step S204). The conversion table generating part 31 determines that the conversion table is completed in a case where all the pixels constituting the display image are displayed and all the pixels are imaged. The conversion table generating part 31 determines that the conversion table is not completed in a case where all the pixels constituting the display image are not displayed and all the pixels are not imaged.

Here, in the case where the determination is made that the conversion table has not been completed (NO in step S204), the processing returns to step S201. Then, the geometric image display control part 30 causes the display device 3 to display the first geometric image where the first dot corresponding to a pixel that is not displayed is expressed in white among the plurality of pixels constituting the display image.

Figures 25, 26:
FIG. 25 is a diagram illustrating another example of the first geometric image displayed on the display device.
FIG. 26 is a diagram illustrating an example of a conversion table in the second embodiment.

FIG. 25 is a diagram illustrating another example of the first geometric image displayed on the display device 3.

For example, the geometric image display control part 30 causes the display device 3 to sequentially display each white dot for one pixel beginning with the upper left pixel on the display image. As illustrated in FIG. 25, after causing the display device 3 to display the first geometric image 81 including the first dot 401 corresponding to the coordinates (u1, v1), the geometric image display control part 30 causes the display device 3 to display a first geometric image 81A where only a first dot 402 corresponding to the coordinates (u2, v2) is expressed in white and pixels other than the first dot 402 arc expressed in black. The position of the first dot 402 is different from the position of the first dot 401.

On the other hand, in a case where the determination is made that the conversion table has been completed (YES in step S204), the image acquiring part 23 acquires the first training image from the first storage part 21 (step S205).

Note that processing in steps S205 to S207 illustrated in FIG. 22 is the same as the processing in steps S101 to S103 illustrated in FIG. 3, and thus will not be described.

FIG. 26 is a diagram illustrating an example of a conversion table according to the second embodiment. The conversion table illustrated in FIG. 26 associates the coordinates (u, v) of each pixel of the display image displayed on the display device 3 with the coordinates (x, y) of each converted pixel of the captured image acquired by the imaging device 4.

For example, a first dot (pixel) at coordinates (u1, v1) on the display image is converted to two second dots (pixels) at coordinates (x1_1, y1_1) and coordinates (x1_2, y1_2) in the captured image.

Returning to FIG. 22, the correct answer information acquiring part 25A acquires first correct answer information corresponding to the displayed first training image from the first storage part 21 (step S208).

Next, the correct answer information converting part 33 converts the first correct answer information acquired by the correct answer information acquiring part 25A to the second correct answer information corresponding to the second training image captured by the imaging device 4 using the conversion table generated by the conversion table generating part 31(step S209). The correct answer information converting part 33 converts coordinates of four vertices of a bounding box, which is the first correct answer information corresponding to the first training image acquired from the first storage part 21, to coordinates of a plurality of points using the conversion table illustrated in FIG. 26. The correct answer information converting part 33 then specifies a rectangular circumscribed bounding box circumscribing a plurality of conversion points. The correct answer information converting part 33 generates correct answer information represented by the specified circumscribed bounding box as the second correct answer information corresponding to the second training image captured by the imaging device 4.

Figure 27:
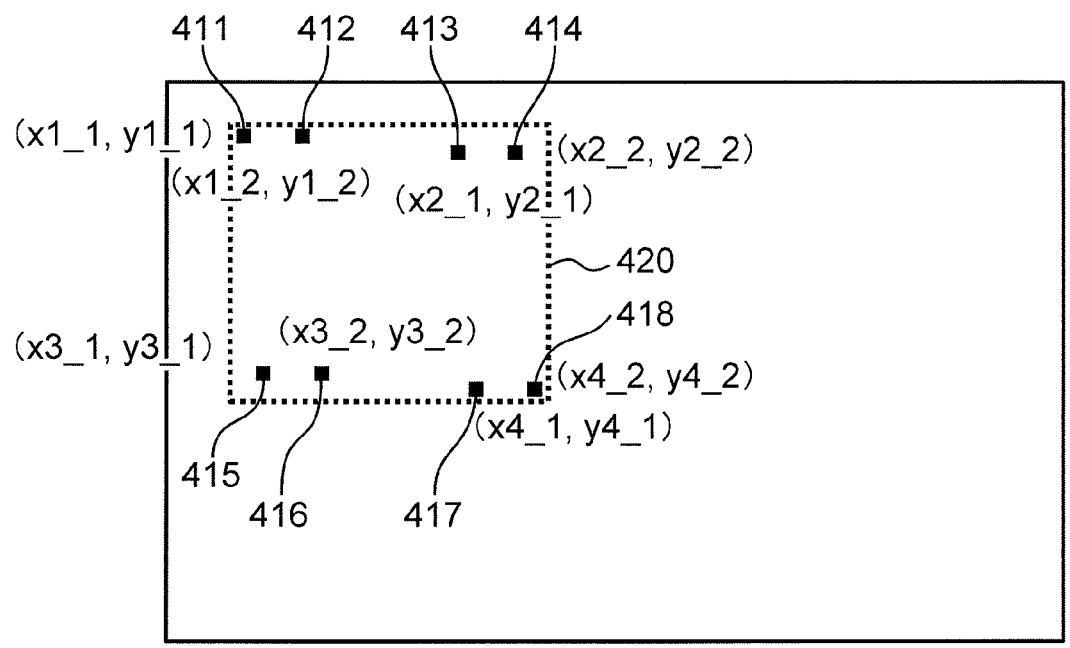
FIG. 27 is a schematic diagram for describing processing for generating second correct answer information in the second embodiment.

FIG. 27 is a schematic diagram for describing processing for generating the second correct answer information in the second embodiment. Here, the coordinates of the four vertices of the bounding box, which is the first correct answer information corresponding to the first training image acquired from the first storage part 21, are (u1, v1), (u2, v2), (u3, v3), and (u4, v4). According to the conversion table illustrated in FIG. 26, the vertex at the coordinates (u1, v1) is converted to points 411 and 412 at coordinates (x1_1, y1_1) and coordinates (x1_2, y1_2) in the second training image. The vertex at the coordinates (u2, v2) is converted to points 413 and 414 at coordinates (x2_1, y2_1) and coordinates (x2_2, y2_2) in the second training image. The vertex at the coordinates (u3, v3) is converted to points 415 and 416 at coordinates (x3_1, y3_1) and coordinates (x3_2, y3_2) in the second training image. Further, the vertex at the coordinates (u4, v4) is converted to points 417 and 418 at coordinates (x4_1, y4_1) and coordinates (x4_2, y4_2) in the second training image. At this time, a circumscribed bounding box 420 circumscribing the points 411 to 418 is generated as the second correct answer information corresponding to the second training image captured by the imaging device 4.

Returning to FIG. 22, the storage control part 29A stores a data set including a set of the second training image acquired by the imaging device 4 and the second correct answer information converted by the correct answer information converting part 33 in the second storage part 22 (step S210).

Thereafter, the image acquiring part 23 determines whether the imaging device 4 has captured all the first training images stored in the first storage part 21 (step S211). Here, in a case where a determination is made that the imaging device 4 has not captured all the first training images (NO in step S211), the processing returns to step S205, and the image acquiring part 23 acquires a first training image that has not been captured from among the plurality of first training images stored in the first storage part 21. Then, the training image display control part 24 causes the display device 3 to display the first training image, and the imaging control part 27A causes the imaging device 4 to capture the displayed first training image. Further, the correct answer information acquiring part 25A acquires first correct answer information corresponding to the first training image. Next, the correct answer information converting part 33 converts the first correct answer information acquired by the correct answer information acquiring part 25A to second correct answer information corresponding to the second training image captured by the imaging device 4 using the conversion table generated by the conversion table generating part 31.

On the other hand, in a case where the determination is made that the imaging device 4 has captured all the first training images (YES in step S211), the processing ends.

As described above, since the imaging system 1A according to the second embodiment can acquire the correct answer information appropriate for a parallax, a more accurate data set can be structured, and the recognition accuracy of the machine learning model can be improved.

In the above description, the geometric image display control part 30 displays one first dot while each first dot is shifted by one pixel, but, a plurality of first dots may be displayed while the plurality of first dots are shifted by one pixel. Processing for simultaneously causing the display device 3 to display the plurality of first dots in a first modification of the second embodiment will be described with reference to FIGS. 28 and 29.

Figure 28:
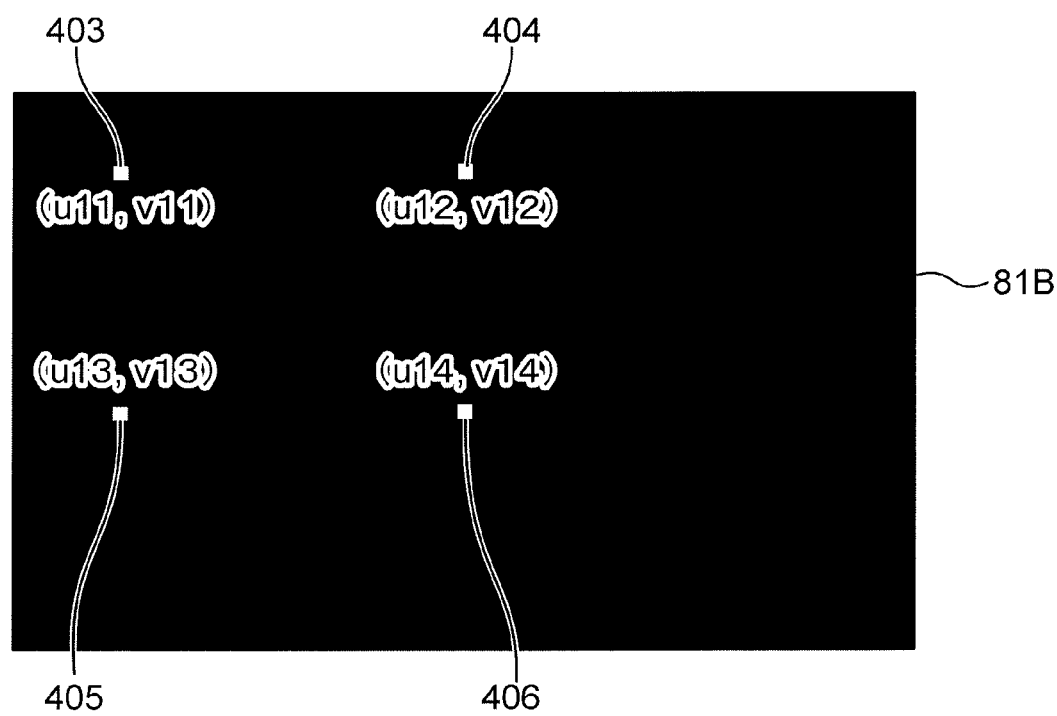
FIG. 28 is a diagram illustrating an example of the first geometric image displayed on the display device in a first modification of the second embodiment.

FIG. 28 is a diagram illustrating an example of the first geometric image displayed on the display device 3 in the first modification of the second embodiment.

As illustrated in FIG. 28, the geometric image display control part 30 causes the display device 3 to display a first geometric image 81B where only first dots 403 to 406 corresponding to coordinates (u11, v11), coordinates (u12, v12), coordinates (u13, v13), and coordinates (u14, v14) of four points among the plurality of pixels are expressed in white. Pixels other than the pixels of the first dots 403 to 406 are black. The geometric image display control part 30 causes the display device 3 to display the first geometric image 81B where only the first dots 403 to 406 corresponding to the four pixels are expressed in white.

Figure 29:
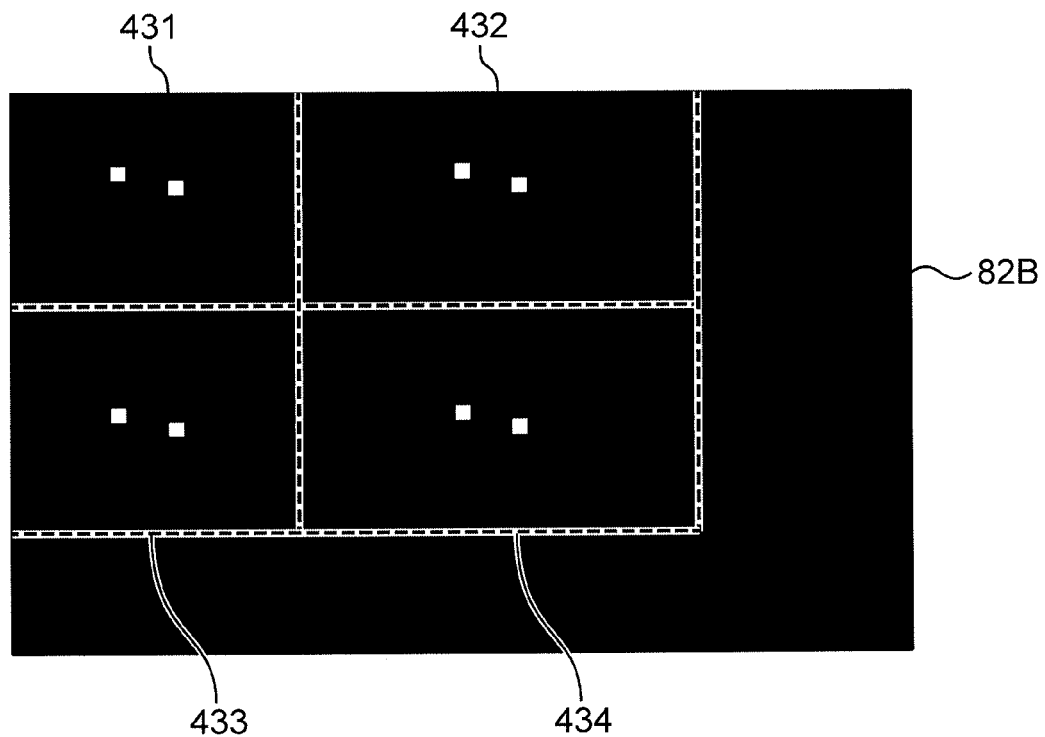
FIG. 29 is a diagram illustrating an example of the second geometric image acquired by causing the imaging device to capture the first geometric image illustrated in FIG. 28.

FIG. 29 is a diagram illustrating an example of the second geometric image acquired by causing the imaging device 4 to capture the first geometric image illustrated in FIG. 28.

As illustrated in FIG. 29, the four first dots 403 to 406 displayed on display device 3 are imaged as a plurality of luminous points having a local maximum luminance value. The conversion table generating part 31 generates, based on an acquired second geometric image 82B, a conversion table for converting the pixel positions (u, v) of the first dots 403 to 406 on the first geometric image 81B to the pixel positions (x, y) of the plurality of second dots on the second geometric image 82B. The Conversion table generating part 31 divides the second geometric image 82B into a plurality of regions correspondingly to the luminous points displayed by display device 3, and calculates the local maximum value of the luminous point for each of the plurality of regions. The conversion table generating part 31 may calculate the coordinates of the luminous points having the local maximum value as the pixel positions (x, y) of the plurality of second dots on the second geometric image 82B corresponding to the pixel positions (u, v) of the first dots 403 to 406 on first geometric image 81B.

Specifically, the conversion table generating part 31 divides the second geometric image 82B into a plurality of regions 431 to 434 correspondingly to the first dots 403 to 406 that are the four luminous points displayed by display device 3. At this time, the conversion table generating part 31 divides the second geometric image 82B into regions depending on the number of the plurality of first dots displayed by display device 3 with a clustering method such as a k-means method. Then, the conversion table generating part 31 specifies coordinates corresponding to the local maximum value of the luminance on the region 431 as the pixel position of the second dot on the second geometric image 82B, the second dot corresponding to first dot 403 on the first geometric image 81B. Further, the conversion table generating part 31 specifies coordinates corresponding to the local maximum value of the luminance on the region 432 as the pixel position of the second dot on the second geometric image 82B, the second dot corresponding to the first dot 404 on the first geometric image 81B. Further, the conversion table generating part 31 specifies coordinates corresponding to the local maximum value of the luminance on the region 433 as the pixel position of the second dot on the second geometric image 82B, the second dot corresponding to first dot 405 on the first geometric image 81B. Further, the conversion table generating part 31 specifies coordinates corresponding to the local maximum value of the luminance on the region 434 as the pixel position of the second dot on the second geometric image 82B, the second dot corresponding to the first dot 406 on the first geometric image 81B.

In addition, the geometric image display control part 30 does not display only a plurality of first white dots but may display a plurality of first dots with different colors. Such processing is effective for processing for simultaneously displaying the plurality of first dots on the display device 3. That is, by changing the color of each of the plurality of first dots displayed on the display device 3, it is possible to specify which first dot is associated with each of the plurality of second dots on the second geometric image 82B captured by the imaging device 4.

Further, in the second embodiment, the first geometric image including the first dot is displayed, the positions of the plurality of second dots are specified from the second geometric image acquired by capturing the first geometric image, and the conversion table for converting the position of the first dot to the positions of the plurality of second dots is created, but the present disclosure is not particularly limited thereto. In a second modification of the second embodiment, the first geometric image may include a first horizontal line and a first vertical line arranged at predetermined positions in the image. The conversion table generating part 31 may specify the positions of a plurality of second horizontal lines and a plurality of second vertical lines from the second geometric image, and generate a conversion table for converting the position of the first horizontal line to the specified positions of the plurality of second horizontal lines and converting the position of the first vertical line into the specified positions of the plurality of second vertical lines.

Figure 30:
FIG. 30 is a diagram illustrating an example of the first geometric image including a first horizontal line displayed on the display device in a second modification of the second embodiment.

FIG. 30 is a diagram illustrating an example of the first geometric image including the first horizontal line displayed on the display device 3 in the second modification of the second embodiment.

As illustrated in FIG. 30, the geometric image display control part 30 causes the display device 3 to display a first geometric image 91A where only a first horizontal line 501 corresponding to a row of pixels in a horizontal direction among the plurality of pixels constituting the display image is expressed in white. Pixels other than the pixels of the first horizontal line 501 are black. First, the geometric image display control part 30 causes the display device 3 to display the first geometric image 91A where only the first horizontal line 501 corresponding to the row of pixels at the upper most portion is expressed in white. Note that the width of the first horizontal line 501 may be a plurality of pixels instead of one pixel.

Figure 31:
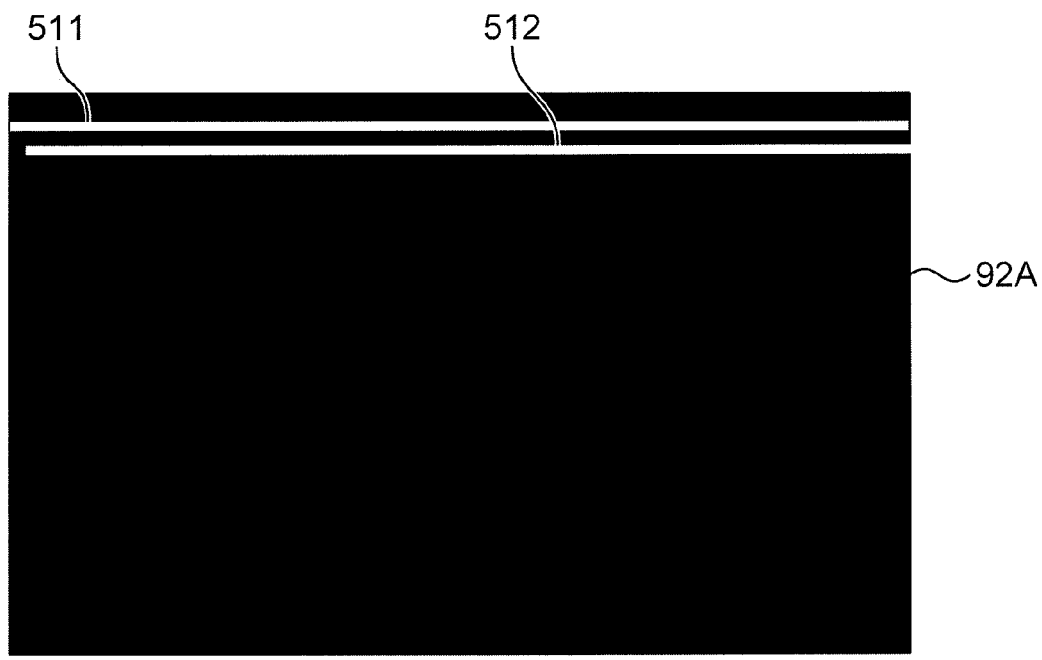
FIG. 31 is a diagram illustrating an example of the second geometric image acquired by causing the imaging device to capture the first geometric image illustrated in FIG. 30.

FIG. 31 is a diagram illustrating an example of a second geometric image acquired by the imaging device 4 capturing the first geometric image illustrated in FIG. 30.

In a second geometric image 92A illustrated in FIG. 31, a second horizontal line 511 is the first horizontal line 501 imaged through the pinhole 2011 on the optical axis, and a second horizontal line 512 is the first horizontal line 501 imaged through the pinhole 2012 not on the optical axis. That is, the first horizontal line 501 in the first geometric image 91A is affected by the parallax due to the imaging device 4, and is converted to the plurality of second horizontal lines 511 and 512 in the second geometric image 92A.

The conversion table generating part 31 specifies the rows of pixels (positions) of the plurality of second horizontal lines 511 and 512 in the second geometric image 92A. Note that the rows of pixels of the second horizontal lines 511 and 512 are represented by the coordinates of left end pixels in the horizontal direction and the coordinates of right end pixels in the horizontal direction. Then, the conversion table generating part 31 generates a conversion table for converting the row of pixels of the first horizontal line 501 in the first geometric image 91A to the rows of pixels of the plurality of second horizontal lines 511 and 512 in the second geometric image 92A. As illustrated in FIG. 31, the first horizontal line 501 displayed on the display device 3 is imaged as two straight lines that are the second horizontal lines 511 and 512.

After displaying the uppermost first horizontal line 501, the geometric image display control part 30 causes the display device 3 to sequentially display the first horizontal lines while each first horizontal line is shifted downward by one pixel. Every time when the first horizontal line is displayed, the imaging control part 27A causes the imaging device 4 to capture the first geometric image 91A and acquires the second geometric image 92A. The conversion table generating part 31 specifies the plurality of second horizontal lines in the second geometric image 92A every time when the second geometric image 92A is acquired. The conversion table generating part 31 generates a conversion table for converting the position of the first horizontal line to the specified positions of the plurality of second horizontal lines.

Figure 32:
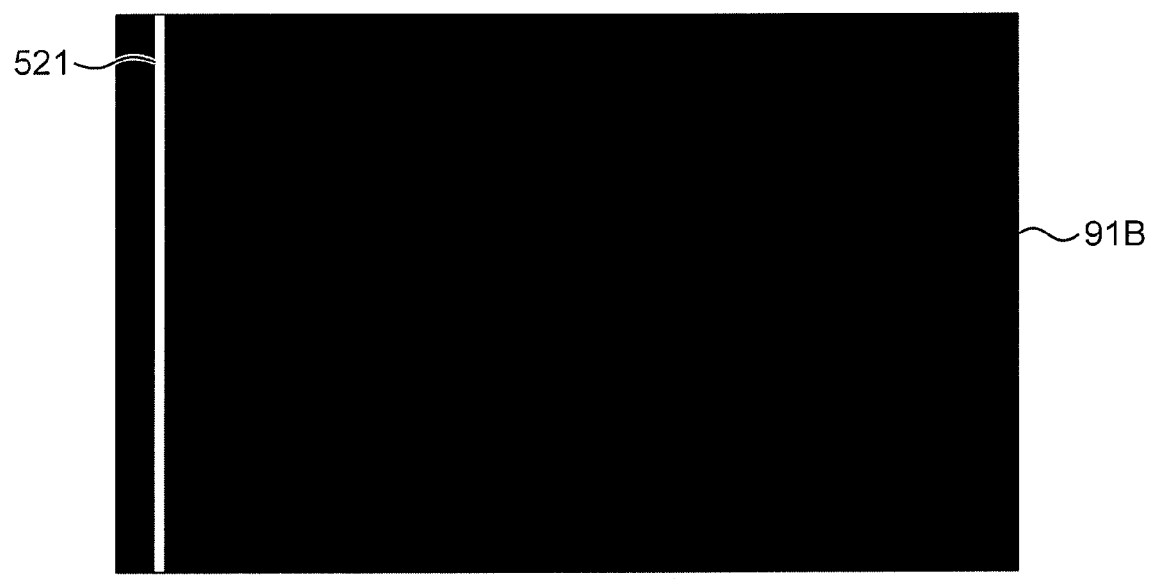
FIG. 32 is a diagram illustrating an example of the first geometric image including a first vertical line displayed on the display device in the second modification of the second embodiment.

FIG. 32 is a diagram illustrating an example of the first geometric image including the first vertical line displayed on the display device 3 in the second modification of the second embodiment.

As illustrated in FIG. 32, the geometric image display control part 30 causes the display device 3 to display a first geometric image 91B where only a first vertical line 521 corresponding to a row of pixels in a vertical direction among the plurality of pixels is expressed in white. The pixels other than the pixels of the first vertical lines 521 are black. First, the geometric image display control part 30 causes the display device 3 to display the first geometric image 91B where only the first vertical line 521 corresponding to the row of pixels at the left end is expressed in white. Note that the width of the first vertical line 521 may be a plurality of pixels instead of single pixel.

Figure 33:
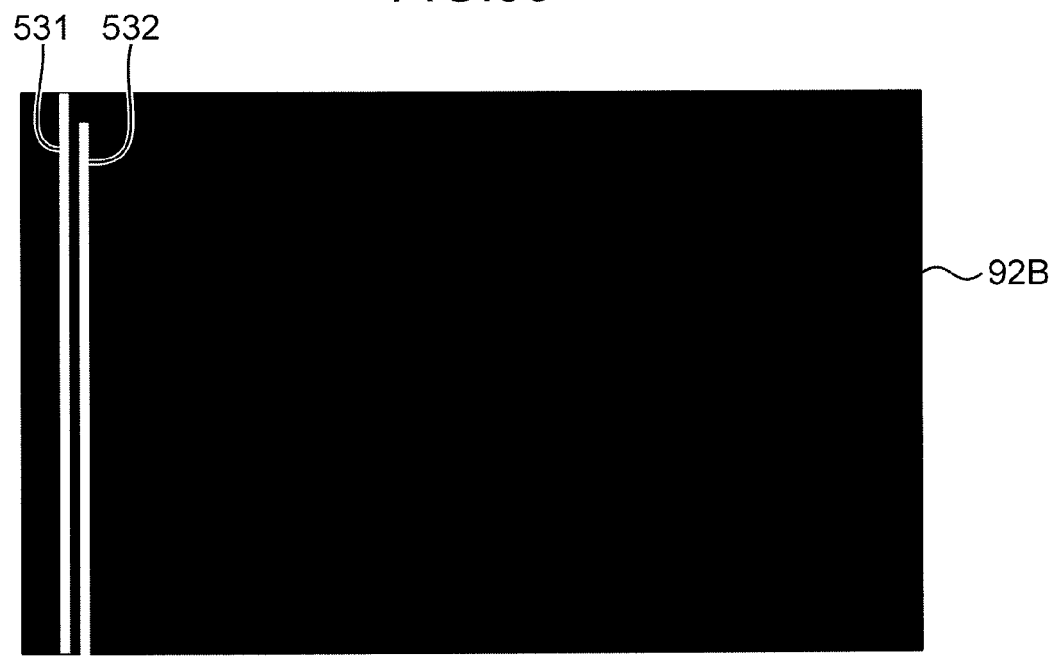
FIG. 33 is a diagram illustrating an example of the second geometric image acquired by causing the imaging device to capture the first geometric image illustrated in FIG. 32.

FIG. 33 is a diagram illustrating an example of a second geometric image acquired by causing the imaging device 4 to capture the first geometric image illustrated in FIG. 32.

In a second geometric image 92B illustrated in FIG. 33, a second vertical line 531 is the first vertical line 521 imaged through the pinhole 2011 on the optical axis, and a second vertical line 532 is the first vertical line 521 imaged through the pinhole 2012 not on the optical axis. That is, the first vertical line 521 in the first geometric image 91B is affected by the parallax due to the imaging device 4, and is converted to the plurality of second vertical lines 531 and 532 in the second geometric image 92B.

The conversion table generating part 31 specifies the rows of pixels (positions) of the plurality of second vertical lines 531 and 532 in the second geometric image 92B. Note that the rows of pixels of the second vertical lines 531 and 532 are represented by the coordinates of upper end pixels in the vertical direction and the coordinates of lower end pixels in the vertical direction. Then, the conversion table generating part 31 generates a conversion table for converting the row of pixels of the first vertical line 521 in the first geometric image 91B to the rows of pixels of the plurality of second vertical lines 531 and 532 in the second geometric image 92B. As illustrated in FIG. 33, the first vertical line 521 displayed on the display device 3 is imaged as two straight lines that are the second vertical lines 531 and 532.

After displaying the leftmost first vertical line 521, the geometric image display control part 30 causes the display device 3 to sequentially display the first vertical lines while each first vertical line is shifted rightward by one pixel. Every time when the first vertical line is displayed, the imaging control part 27A causes the imaging device 4 to capture the first geometric image 91B and acquires the second geometric image 92B. The conversion table generating part 31 specifies the positions of the plurality of second vertical lines in the second geometric image 92A every time when the second geometric image 92B is acquired. The conversion table generating part 31 generates a conversion table for converting the position of the first vertical line to the specified positions of the plurality of second vertical lines.

Naturally, the rows of pixels of the second horizontal line or the second vertical line may not be represented by the coordinates of the left end pixel in the horizontal direction and the coordinates of the right end pixel in the horizontal direction, or by the coordinates of the upper end pixel in the vertical direction and the coordinates of the lower end pixel in the vertical direction, but may be represented by the coordinates of all the pixels on the second horizontal line or the second vertical line.

The conversion table generation processing in the second modification of the second embodiment has been described above.

Thereafter, the processing for generating the second correct answer information in the second modification of the second embodiment will be described.

Figure 34:
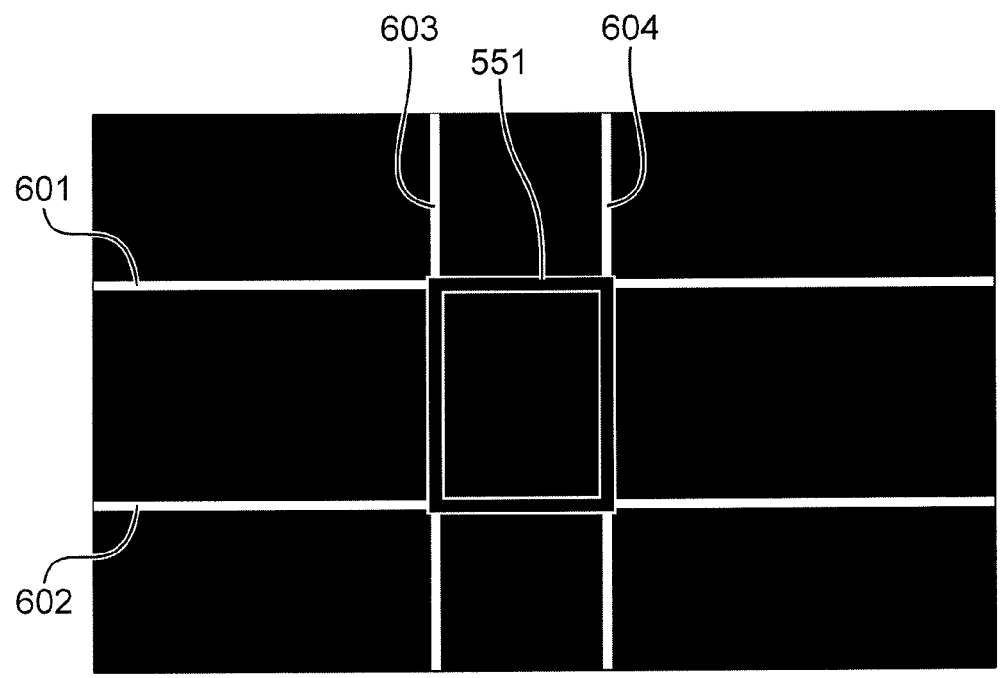
FIG. 34 is a diagram illustrating an example of first correct answer information in the second modification of the second embodiment.
Figure 35:
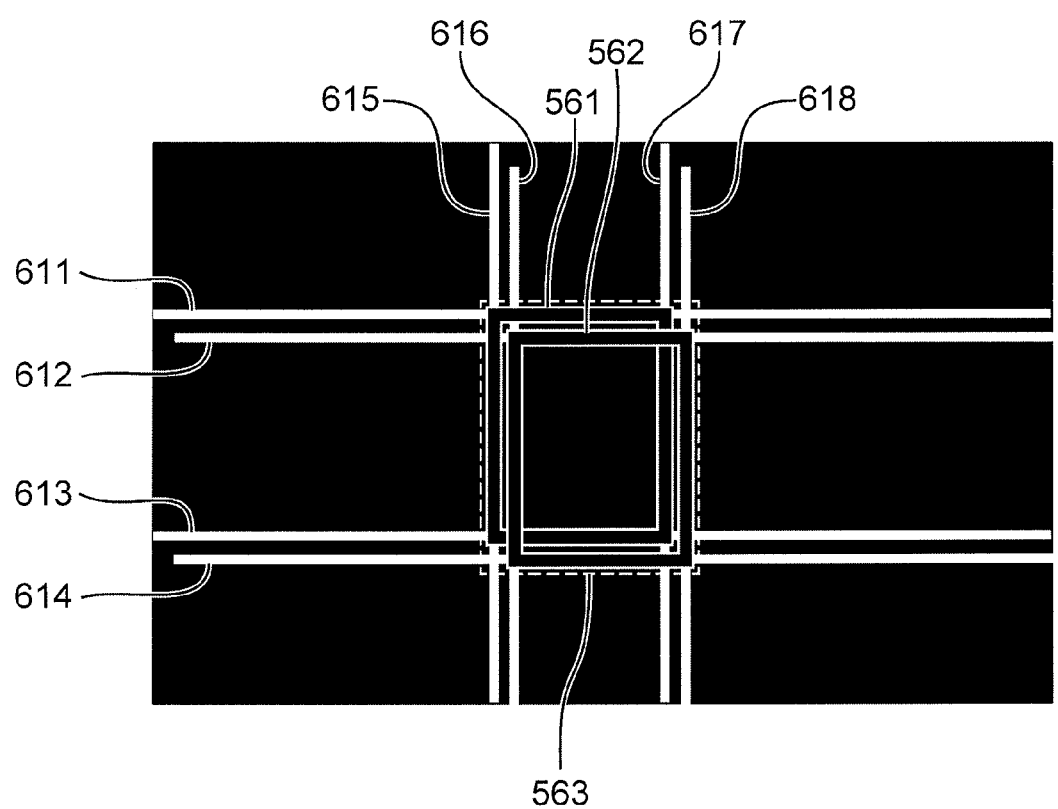
FIG. 35 is a diagram illustrating an example of second correct answer information in the second modification of the second embodiment.

FIG. 34 is a diagram illustrating an example of first correct answer information in the second modification of the second embodiment, and FIG. 35 is a diagram illustrating an example of second correct answer information in the second modification of the second embodiment.

A rectangular bounding box 551 is the first correct answer information corresponding to the first training image as illustrated in FIG. 34. Each side of the bounding box 551 is on two first horizontal lines 601 and 602 and two first vertical lines 603 and 604. As illustrated in FIG. 35, the first horizontal line 601 is converted to two second horizontal lines 611 and 612, the first horizontal line 602 is converted to two second horizontal lines 613 and 614, the first vertical line 603 is converted to two second vertical lines 615 and 616, and the first vertical line 604 is converted to two second vertical lines 617 and 618.

That is, the correct answer information converting part 33 converts four lines of the bounding box 551 that is the first correct answer information corresponding to the first training image acquired from the first storage part 21, to a plurality of lines using the conversion table. Then, the correct answer information converting part 33 specifies a rectangular circumscribed bounding box 563 circumscribing a bounding box 561 surrounded by the second horizontal lines 611 and 613 and the second vertical lines 615 and 617 and a bounding box 562 surrounded by the second horizontal lines 612 and 614 and the second vertical lines 616 and 618. The correct answer information converting part 33 generates correct answer information represented by the specified circumscribed bounding box 563, as the second correct answer information corresponding to the second training image captured by the imaging device 4.

Note that in the second modification of the second embodiment, the geometric image display control part 30 causes the display device 3 to display one first horizontal line while the line is shifted by one row of pixels, and one first vertical line while the line is shifted by one row of pixels, but the present disclosure is not particularly limited thereto. The geometric image display control part 30 may cause the display device 3 to display the plurality of first horizontal lines while the plurality of first horizontal lines is shifted by one row of pixels. Every time when the plurality of first horizontal lines is displayed, the imaging control part 27A causes the imaging device 4 to capture the first geometric image and acquires the second geometric image. Every time when the second geometric image is acquired, the conversion table generating part 31 may specify the positions of the plurality of second horizontal lines in the second geometric image. The conversion table generating part 31 may generate a conversion table for converting the positions of the plurality of first horizontal lines to the specified positions of the plurality of second horizontal lines.

Further, the geometric image display control part 30 may cause the display device 3 to display the plurality of first vertical lines while the plurality of first vertical lines is shifted by one row of pixels. Every time when the plurality of first vertical lines is displayed, the imaging control part 27A causes the imaging device 4 to capture the first geometric image and acquires the second geometric image. Every time when the second geometric image is acquired, the conversion table generating part 31 may specify the positions of the plurality of second vertical lines in the second geometric image. The conversion table generating part 31 may generate a conversion table for converting the positions of the plurality of first vertical lines to the specified positions of the plurality of second vertical lines.

Further, the geometric image display control part 30 may cause the display device 3 to simultaneously display at least one first horizontal line and at least one first vertical line while the first horizontal and vertical lines are each shifted by one row of pixels. Every time when the at least one first horizontal line and the at least one first vertical line are displayed, the imaging control part 27A causes the imaging device 4 to capture the first geometric image and acquires the second geometric image. Every time when the second geometric image is acquired, the conversion table generating part 31 may specify the positions of the plurality of second horizontal lines and the plurality of second vertical lines in the second geometric image. The conversion table generating part 31 may generate a conversion table for converting the positions of the at least one first horizontal line and the at least one first vertical line to the specified positions of the plurality of second horizontal lines and the plurality of second vertical lines.

Further, in the second embodiment, the geometric image display control part 30 may causes the display device 3 to display the first dot based on the first correct answer information. For example, the geometric image display control part 30 may cause the display device 3 to display at least one first dot while the first dot is shifted by one pixel along the contour of the bounding box that is the first correct answer information. Every time when the at least one first dot is displayed, the imaging control part 27A causes the imaging device 4 to capture the first geometric image and acquires the second geometric image. Every time when the second geometric image is acquired, the conversion table generating part 31 may specify the positions of the plurality of second dots in the second geometric image. The conversion table generating part 31 may generate a conversion table for converting the position of the at least one first dot to the specified positions of the plurality of second dots.

Note that, in this case, the geometric image display control part 30 may refer to the conversion table before the at least one first dot included in the contour of the bounding box is displayed, and determine whether the position of the at least one first dot is already associated with the positions of the plurality of second dots in the conversion table. In a case where the position of the at least one first dot is already associated with the positions of the plurality of second dots in the conversion table, the geometric image display control part 30 may not cause the display device 3 to display the at least one first dot. On the other hand, in a case where the position of the at least one first dot is not associated with the positions of the plurality of second dots in the conversion table, the geometric image display control part 30 may cause the display device 3 to display the at least one first dot.

Further, in the second embodiment, the geometric image display control part 30 may cause the display device to display the first horizontal line or the first vertical line based on the first correct answer information. For example, the geometric image display control part 30 may cause the display device 3 to display a first horizontal line corresponding to an upper side or a lower side of a contour of a bounding box, which is the first correct answer information, or display a first vertical line corresponding to a left side or a right side of the contour of the bounding box. Every time when the first horizontal line or the first vertical lines is displayed, the imaging control part 27A causes the imaging device 4 to capture the first geometric image and acquires the second geometric image. Every time when the second geometric image is acquired, the conversion table generating part 31 may specify the positions of the plurality of second horizontal lines or the plurality of second vertical lines in the second geometric image. The conversion table generating part 31 may generate a conversion table for converting the position of the first horizontal line or the first vertical line to the specified positions of the plurality of second horizontal lines or the plurality of second vertical lines.

Note that, in this case, the geometric image display control part 30 may refer to the conversion table before the first horizontal line or the first vertical line included in the contour of the bounding box is displayed, and determine whether the position of the first horizontal line or the first vertical line is already associated with the positions of the plurality of second horizontal lines or the plurality of second vertical lines in the conversion table. In a case where the position of the first horizontal line or the first vertical line is already associated with the positions of the plurality of second horizontal lines or the plurality of second vertical lines in the conversion table, the geometric image display control part 30 may not cause the display device 3 to display the first horizontal line or the first vertical line. On the other hand, in a case where the position of the first horizontal line or the first vertical line is not associated with the positions of the plurality of second horizontal lines or the plurality of second vertical lines in the conversion table, the geometric image display control part 30 may cause the display device 3 to display the first horizontal line or the first vertical line.

Third Embodiment

In the first embodiment and the second embodiment, the data set including the set of the second training image and the second correct answer information is stored in the second storage part, but in a third embodiment, the machine learning model is trained by using the data set that includes the set of the second training image and the second correct answer information and is stored in the second storage part.

Figure 36:
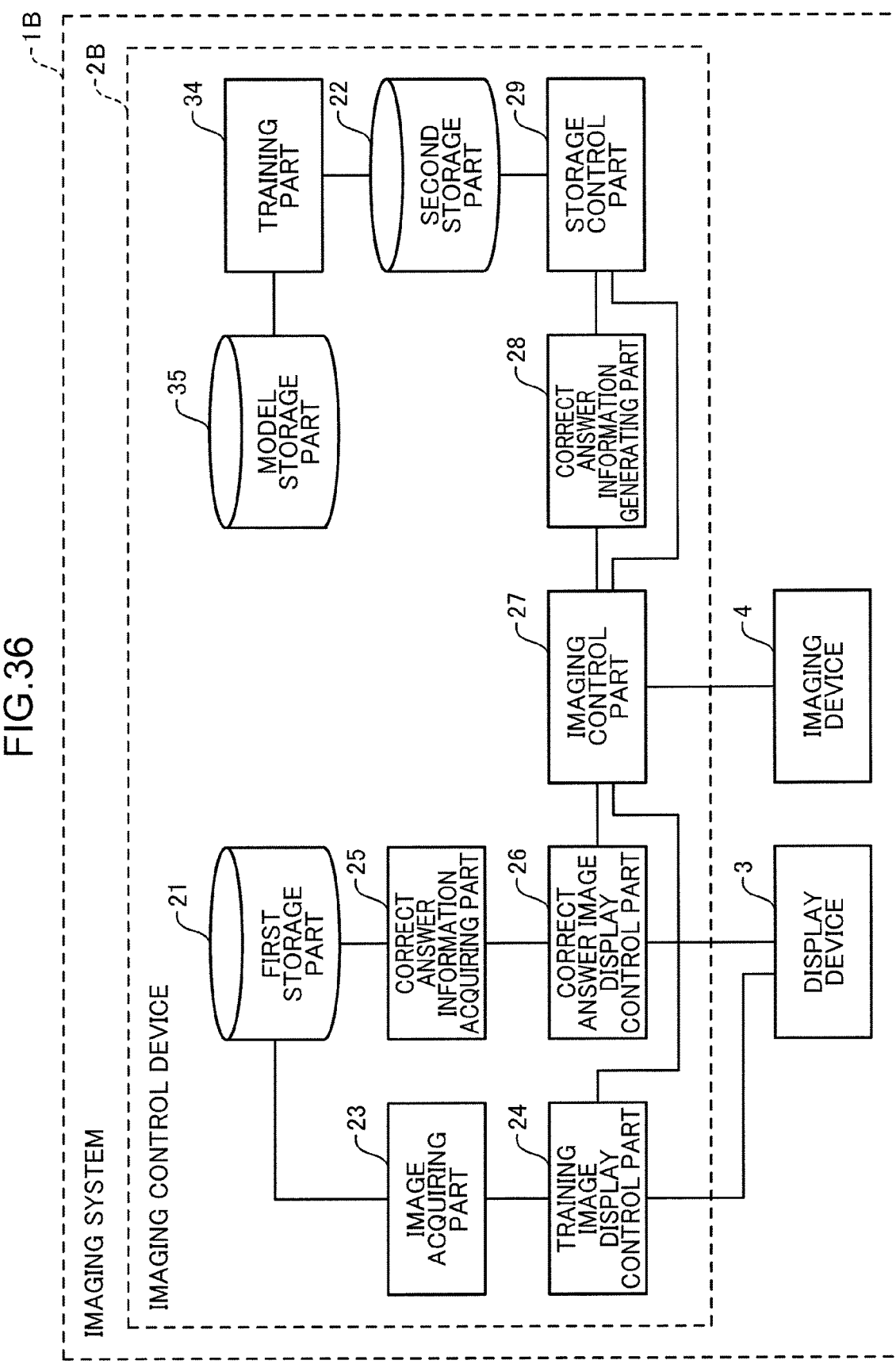
FIG. 36 is a block diagram illustrating an example of an overall configuration of an imaging system according to a third embodiment of the present disclosure.

FIG. 36 is a block diagram illustrating an example of an overall configuration of an imaging system 1B according to the third embodiment of the present disclosure. In FIG. 36, the same components as those in FIG. 1 are denoted by the same reference numerals, and description thereof is omitted.

The imaging system 1B includes an imaging control device 2B, a display device 3, and an imaging device 4.

The imaging control device 2B includes a first storage part 21, a second storage part 22, an image acquiring part 23, a training image display control part 24, a correct answer information acquiring part 25, a correct answer image display control part 26, an imaging control part 27, a correct answer information generating part 28, a storage control part 29, a training part 34, and a model storage part 35.

The training part 34 trains the machine learning model using a data set that includes a set of a second captured training image and second correct answer information and is stored in the second storage part 22. In the third embodiment, the machine learning model applied to an identifier is a machine learning model using a neural network such as deep learning, but may be another machine learning model. For example, the machine learning model may be a machine learning model using random forest, genetic programming, or the like.

The machine learning in the training part 34 is implemented by, for example, an error back propagation (BP) method in deep learning or the like. Specifically, the training part 34 inputs the second training image to the machine learning model and acquires a recognition result output from the machine learning model. Then, the training part 34 adjusts the machine learning model so that the recognition result becomes the second correct answer information. The training part 34 repeats the adjustment of the machine learning model for a plurality of sets (for example, several thousand sets) of different second training images and second correct answer information to improve the recognition accuracy of the machine learning model.

The model storage part 35 stores the trained machine learning model. The machine learning model is also an image recognition model used for image recognition.

In the third embodiment, although the imaging control device 2B includes the training part 34 and the model storage part 35, the present disclosure is not particularly limited thereto, and an external computer connected to the imaging control device 2B via a network may include the training part 34 and the model storage part 35. In this case, the imaging control device 2B may further include a communication part that transmits the data sets to the external computer. Furthermore, the external computer connected to the imaging control device 2B via the network may include the model storage part 35. In this case, the imaging control device 2B may further include a communication part that transmits the trained machine learning model to the external computer.

The imaging system 1B of the third embodiment can use depth information of a subject included in parallax information as training data, and this is effective for improving the recognition capability of the machine learning model. For example, the machine learning model can recognize that an object appearing small in an image is a subject existing far away, and can prevent the object from being recognized as dirt, that is, from being ignored. Therefore, the machine learning model constructed by the machine learning using the second training image can improve the recognition performance.

The imaging system 1B according to the third embodiment displays the first training image stored in the first storage part 21, captures the first training image to acquire second training image from the imaging device 4. Further, the imaging system 1B displays the first correct answer image based on the first correct answer information stored in the first storage part 21, captures the first correct answer image to acquire the second correct answer image from the imaging device 4. Then, the imaging system 1B generates the second correct answer information based on the second correct answer image, stores the data set including the set of the second training image and the second correct answer information in the second storage part 22, and uses the stored data set for training.

As described above, the imaging system 1B is effective not only for training to optimize parameters of the machine learning but also for optimizing device parameters of the imaging device 4. In a case where the multi-pinhole camera is used as the imaging device 4, the recognition performance and the privacy protection performance of the imaging device 4 depend on device parameters such as the size of each pinhole, the shape of each pinhole, the disposition of each pinhole, and the number of pinholes. Therefore, in order to implement an optimal recognition system, it is necessary to optimize not only the parameters of machine learning but also the device parameters of the imaging device 4, such as the size of each pinhole, the shape of each pinhole, the disposition of each pinhole, and the number of pinholes. The imaging system 1B according to the third embodiment trains and evaluates the second training image acquired when the device parameters of the imaging device 4 are changed to be able to select a device parameter having a high recognition rate and high privacy protection performance as an optimal device parameter.

In each of the above embodiments, each component may be implemented by being configured with dedicated hardware or by execution of a software program suitable for each component. Each component may be implemented by a program execution unit, such as a central processing unit (CPU) or a processor, reading and executing a software program recorded in a recording medium such as a hard disk or a semiconductor memory. In addition, the program may be recorded in a recording medium and transferred, or the program may be transferred via a network to carry out the program using another independent computer system.

Some or all of the functions of the devices according to the embodiments of the present disclosure are implemented as large scale integration (LSI), which is typically an integrated circuit. These may be individually integrated into one chip, or may be integrated into one chip so as to include some or all of them. In addition, the circuit integration is not limited to LSI, and may be implemented by a dedicated circuit or a general-purpose processor. A field programmable gate array (FPGA), which can be programmed after manufacturing of LSI, or a reconfigurable processor in which connections and setting of circuit cells inside LSI can be reconfigured may be used.

Some or all of the functions of the devices according to the embodiments of the present disclosure may be implemented by a processor such as a CPU executing a program.

The numbers used above are all illustrated to specifically describe the present disclosure, and the present disclosure is not limited to the illustrated numbers.

The order in which each step illustrated in the above flowcharts is executed is for specifically describing the present disclosure, and may be any order other than the above order as long as a similar effect is obtained. Some of the above steps may be executed simultaneously (in parallel) with other steps.

INDUSTRIAL APPLICABILITY

The technology of the present disclosure can improve the recognition accuracy of a machine learning model while protecting the privacy of a subject, and thus is useful as a technology of creating a data set to be used for training of the machine learning model.

The invention claimed is:

1. An information processing system, comprising:
    a correct answer information acquiring part that acquires first correct answer information corresponding to a training image of a machine learning model from a first storage part;
    a correct answer image display control part that causes a display device to display a first correct answer image based on the first correct answer information;
    an imaging control part that causes an imaging device that acquires a blurred image to capture the first correct answer image displayed on the display device and acquires a blurred second correct answer image from the image device;
    a generating part that generates second correct answer information based on the second correct answer image; and
    a storage control part that stores a data set including a set of the training image and the second correct answer information in a second storage part.

2. The information processing system according to claim 1, wherein the first correct answer image includes an object indicating a position of the first correct answer information in an image.

3. The information processing system according to claim 2,
    wherein the object is a frame,
    wherein the imaging control part acquires the second correct answer image where a plurality of the frames is superimposed, and
    wherein the generating part selects one frame from the plurality of the frames based on luminance or a position of each of the plurality of the frames in the second correct answer image, and generates correct answer information represented by the one frame selected among the plurality of the frames, as the second correct answer information.

4. The information processing system according to claim 2,
    wherein the object is a frame,
    wherein the imaging control part acquires the second correct answer image where a plurality of the frames is superimposed, and wherein the generating part specifies a circumscribed frame circumscribing the plurality of the frames in the second correct answer image and generates correct answer information represented by the specified circumscribed frame as the second correct answer information.

5. The information processing system according to claim 2,
wherein the object is a frame,
wherein the imaging control part acquires the second correct answer image where a plurality of the frames is superimposed, and
wherein the generating part specifies a circumscribed frame circumscribing the plurality of the frames in the second correct answer image, determines a center of the specified circumscribed frame as a reference position in the image, and generates correct answer information represented by a frame whose center is the determined reference position and whose size is identical to the frame, as the second correct answer information.

6. The information processing system according to claim 2,
wherein the object is a first region,
wherein the imaging control part acquires the second correct answer image where a plurality of the first regions is superimposed, and
wherein the generating part determines a reference position in the image based on luminance of a second region where the plurality of the first regions is superimposed in the second correct answer image, and generates correct answer information represented by a region whose center is the determined reference position and whose size is identical to the first region, as the second correct answer information.

7. The information processing system according to claim 2,
wherein the object is a first region,
wherein the imaging control part acquires the second correct answer image where a plurality of the first regions is superimposed, and
wherein the generating part specifies a circumscribed frame circumscribing a second region where the plurality of the first regions is superimposed in the second correct answer image, and generates correct answer information represented by the specified circumscribed frame, as the second correct answer information.

8. The information processing system according to claim 2,
wherein the object is a first region,
wherein the imaging control part acquires the second correct answer image where a plurality of the first regions is superimposed, and
wherein the generating part specifies a circumscribed frame circumscribing a second region where the plurality of the first regions is superimposed in the second correct answer image, determines a center of the specified circumscribed frame as a reference position in the image, and generates correct answer information represented by a region whose center is the determined reference position and whose size is identical to the first region, as the second correct answer information.

9. The information processing system according to claim 2, wherein the generating part specifies a region including a plurality of objects in the second correct answer image, and generates correct answer information represented by the specified region, as the second correct answer information.

10. The information processing system according to claim 1, wherein the training image stored in the first storage part is a first training image without blurring, the first training image being acquired by another imaging device different from the imaging device, the system further comprising:
an image acquiring part that acquires the first training image from the first storage part; and
a training image display control part that causes the display device to display the first training image,
wherein the imaging control part causes the imaging device to capture the first training image displayed on the display device and acquires a second training image, and
wherein the storage control part stores a data set including a set of the second training image and the second correct answer information in the second storage part.

11. The information processing system according to claim 1, further comprising a training part that trains the machine learning model using a data set that includes a set of the training image and the second correct answer information and is stored in the second storage part.

12. An information processing method with which a computer performs the method comprising:
acquiring first correct answer information corresponding to a training image of a machine learning model from a first storage part;
causing a display device to display a first correct answer image based on the first correct answer information;
causing an imaging device that acquires a blurred image to capture the first correct answer image displayed on the display device, and acquiring a blurred second correct answer image from the image device;
generating second correct answer information based on the second correct answer image; and
storing a data set including a set of the training image and the second correct answer information in a second storage part.

13. An information processing system, comprising:
a processor; and
a memory including a program that, when executed by the processor, causes the processor to execute:
acquiring first correct answer information corresponding to a training image of a machine learning model from a first storage;
causing a display device to display a first correct answer image based on the first correct answer information;
causing an imaging device that acquires a blurred image to capture the first correct answer image displayed on the display device and acquires a blurred second correct answer image from the image device;
generating second correct answer information based on the second correct answer image; and
storing a data set including a set of the training image and the second correct answer information in a second storage.

* * * * *